US010255272B2

United States Patent
Ciulla et al.

(10) Patent No.: US 10,255,272 B2
(45) Date of Patent: *Apr. 9, 2019

(54) ADJUSTMENT OF DOCUMENT RELATIONSHIP GRAPHS

(71) Applicant: Quid, Inc., San Francisco, CA (US)

(72) Inventors: Fabio Ciulla, San Francisco, CA (US); Wojciech Musial, San Francisco, CA (US); Ruggero Altair Tacchi, San Francisco, CA (US)

(73) Assignee: Quid, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/472,977

(22) Filed: Mar. 29, 2017

(65) Prior Publication Data
US 2018/0039620 A1    Feb. 8, 2018

Related U.S. Application Data

(63) Continuation of application No. 15/226,093, filed on Aug. 2, 2016, now Pat. No. 9,645,999.

(51) Int. Cl.
G06F 17/27    (2006.01)
G06F 17/30    (2006.01)

(52) U.S. Cl.
CPC ...... *G06F 17/2785* (2013.01); *G06F 17/2775* (2013.01); *G06F 17/30011* (2013.01); *G06F 17/30705* (2013.01); *G06F 17/30713* (2013.01); *G06F 17/30958* (2013.01)

(58) Field of Classification Search
None
See application file for complete search history.

(56) References Cited

U.S. PATENT DOCUMENTS

2009/0204609 A1* 8/2009 Labrou ............... G06F 17/3064
2009/0300007 A1* 12/2009 Hiraoka ............ G06F 17/30011
(Continued)

OTHER PUBLICATIONS

Liu (Liu, Yew-Huey, Paul Dantzig, Martin Sachs, James T. Corey, Mark T. Hinnebusch, Marc Damashek, and Jonathan Cohen. "Visualizing document classification: a search aid for the digital library." Journal of the Association for Information Science and Technology 51, No. 3 (2000): 216-227.).*

(Continued)

*Primary Examiner* — Pierre Louis Desir
*Assistant Examiner* — Jonathan C Kim
(74) *Attorney, Agent, or Firm* — Pillsbury Winthrop Shaw Pittman LLP

(57) ABSTRACT

Provided is a process of modifying semantic similarity graphs representative of pair-wise similarity between documents in a corpus, the method comprising obtaining a semantic similarity graph that comprises more than 500 nodes and more than 1000 weighted edges, each node representing a document of a corpus, and each edge weight indicating an amount of similarity between a pair of documents corresponding to the respective nodes connected by the respective edge; obtaining an n-gram indicating that edge weights affected by the n-gram are to be increased or decreased; expanding the n-gram to produce a set of expansion n-grams; adjusting edge weights of edges between pairs of documents in which members of the expanded n-gram set co-occur.

27 Claims, 9 Drawing Sheets

(56) References Cited

U.S. PATENT DOCUMENTS

2010/0153324 A1* 6/2010 Downs ............... G06F 17/2745
706/21
2012/0131031 A1* 5/2012 Xie .................. G06F 17/30672
707/765

OTHER PUBLICATIONS

Vechtomova (Vechtomova, Olga, Stephen Robertson, and Susan Jones. "Query expansion with long-span collocates." Information Retrieval 6, No. 2 (2003): 251-273.).*

Liu (Liu, Yew-Huey, Paul Dantzig, Martin Sachs, James T. Corey, Mark T. Hinnebusch, Marc Damashek, and Jonathan Cohen. "Visualizing document classification: a search aid for the digital library." Journal of the Association for Information Science and Technology 51, No. 3 (2000): 216-227.) (Year: 2000).*

Vechtomova (Vechtomova, Olga, Stephen Robertson, and Susan Jones. "Query expansion with long-span collocates." Information Retrieval 6, No. 2 (2003): 251-273.) (Year: 2003).*

* cited by examiner

ADJUSTMENT OF DOCUMENT RELATIONSHIP GRAPHS

CROSS-REFERENCE TO RELATED APPLICATIONS

The present patent is a continuation of U.S. patent application Ser. No. 15/226,093, filed 2 Aug. 2016, having the same title, the entire content of which is hereby incorporated by reference.

BACKGROUND

1. Field

The present invention relates generally to computational linguistics and, more specifically, to systems, methods, and techniques for adjusting graphs of relationships between documents.

2. Description of the Related Art

The digitalization of everyday life activities has promoted the use of wearable technology and smartphones, and the widespread use of the Internet as a tool to exchange information has contributed heavily to a great increase in the amount of available data during the last few decades. A large majority of this data is unstructured data, such as plain text. As a consequence, the ability to effectively extract information from corpora of text in an automated way has increased in importance.

One often wishes to draw inferences based on information contained in and distributed among a relatively large collection (i.e., corpus) of documents, e.g., among substantially more documents than one has time to read or the cognitive capacity to analyze. Certain types of inferences implicate relationships between those documents and clusters of documents. For example, it may be useful to organize pairs of documents by the similarity of terms in the documents. In some cases, topics can be derived from such organization. Examples might include organizing restaurants based on restaurant reviews, organizing companies based on content in company web sites, organizing current events or public figures based on new stories, and organizing movies based on dialogue.

One family of techniques for making such inferences is computational linguistic analysis of text (e.g., unstructured text) within the documents of a corpus, such as with natural language processing (NLP) techniques or those based on distributional semantics. Distributional semantics is typically used for characterizing semantic similarities between terms (i.e., linguistic items), which is based on the assumption that terms used and occurring in the same contexts tend to purport similar meanings. Computational linguistics is often used to perform semantic similarity analyses within corpora to gauge document pair-wise similarity of the documents according to various metrics or pair-wise measures of relationships between entities, topics, terms, or sentiments discussed in the documents, which may be crafted to yield results like those described above. Through the sophisticated use of such techniques, inferences that would otherwise be impractical are potentially attainable (e.g., in a multi-dimensional analysis of at least two vectors), even from relatively large corpora or clusters of documents.

Among the tools of computational linguistics are semantic similarity graphs. These are graphs (also referred to as networks) in which nodes represent documents, and edges (also called links) connect respective pairs of the nodes. The edges indicate an amount of semantic similarity between the documents represented by the two nodes each edge connects. Such graphs can be quite complicated for large collections of documents and are powerful tools for representing the underlying relationships in corpora.

Semantic similarity graphs (and other document relationship graphs) can be very difficult for users to edit. Often in such graphs, sets of documents will appear to cluster (or explicitly be clustered with subsequent processing) for reasons that are not fully readily apparent to the user. A user may see that the graph contains a large cluster of documents for which the user would like a more fine-grained representation, or the user may see a set of smaller clusters that group the documents in ways that are unhelpful. Even graphs devoid of clusters can suffer from these issues, as relationships may be represented in the graph that are unhelpful to the user. Devising a strategy to edit the semantic similarity graph to mitigate these types problems can be difficult for users.

A user may, for example, only have recourse to a technique that expands or contracts a list of stop-words (e.g., manipulating a "blacklist" of words excluded from the similarity analysis). And it can be very difficult for users to identify every word (e.g., due to a limited familiarity with a certain lexicon) that might be contributing to relationships in the graph that they wish to enhance or suppress. Further, traditional techniques are often relatively slow and computationally resource intensive when responding to such edits.

SUMMARY

The following is a non-exhaustive listing of some aspects of the present techniques. These and other aspects are described in the following disclosure.

Provided is a process of modifying semantic similarity graphs representative of pair-wise similarity between documents in a corpus, the process including: obtaining, with one or more processors, a semantic similarity graph that comprises more than 500 nodes and more than 1000 weighted edges, each node representing a document of a corpus, and each edge weight indicating an amount of similarity between a pair of documents corresponding to the respective nodes connected by the respective edge; after obtaining the semantic similarity graph, obtaining, with one or more processors, an n-gram indicating that edge weights affected by the n-gram are to be increased or decreased; expanding, with one or more processors, the n-gram to produce a set of expansion n-grams, wherein expanding the n-gram comprises: determining which documents in at least part of the corpus contain the n-gram to form a first set of documents; determining which documents in at least part of the corpus do not contain the n-gram to form a second set of documents, the first set of documents and the second set of documents each including more than 20 documents; selecting a set of candidate n-grams from the first set of documents, the set of candidate n-grams having more than five n-grams; determining an amount of times each candidate n-gram occurs in the first set of documents to form a first amount; determining an amount of times each candidate n-gram occurs in the second set of documents to form a second amount; determining, for each of the candidate n-grams, a candidate n-gram score based on the first amount and the second amount, wherein the candidate n-gram scores tends to increase or decrease as a ratio of the first amount to the second amount increases or decreases; and selecting expansion n-grams based on the candidate n-gram scores, the expansion n-grams and n-gram collectively forming an adjustment n-gram set; adjusting, with one or more processors, edge weights of the semantic similarity graph of edges between pairs of documents in which members of the adjustment n-gram set co-occur in response to determining that the respective documents contain a member of the adjustment n-gram set; and storing the adjusted weights in memory.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
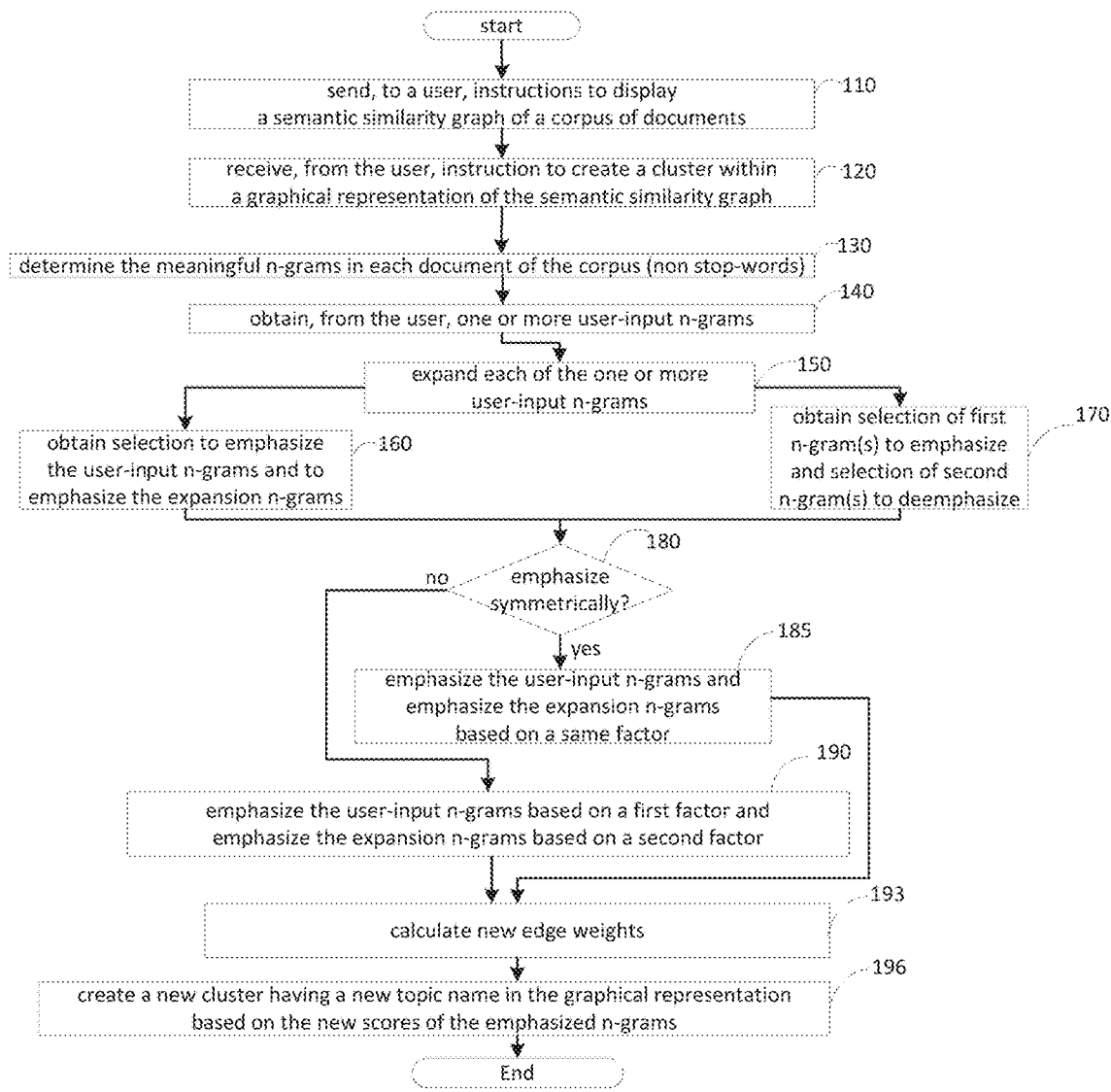
FIG. 1 is a flow chart of an example of a process for creating a new cluster in a clustered (graphical) representation of a semantic similarity graph.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed; rather, the intention is to cover all modifications, equivalents, and alternatives falling within the spirit and scope of the present invention as defined by the appended claims.

DETAILED DESCRIPTION OF EMBODIMENTS

To mitigate the problems described herein, the inventors had to both invent solutions and, in some cases just as importantly, recognize problems overlooked (or not yet foreseen) by others at the intersection of the fields of computational linguistics and human-computer interaction. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific and not all embodiments address every problem with traditional systems described herein or provide every benefit described herein. That said, not all embodiments provide all of these benefits, as several inventions are described, and the different inventions are independently useful.

In some embodiments, a computing system may create and display to a user a similarity graph that represents relationships between documents (e.g., unstructured text) of a corpus. To form the graph, in some implementations, each term within a document may be numerically scored, taking into account the number of instances of the term within the document and in the entire corpus (e.g., TF-IDF, Okapi BM25, etc.) or some other larger sample. Based on these score, some embodiments may determine pairwise relationships of nodes within the similarity graph, e.g., by encoding these relationships as edge weights. In some cases, based on the scores, the computing system may create a graphical representation of a graph, e.g., a force-directed graph such that pairs of nodes (e.g., documents) that have many non-trivial, commonly shared terms are closer to each other than other pairs of nodes that do not. The computing system may also create clusters of nodes at a higher level of synthesis including two or more nodes, for the sake of improved readability of the similarity graph.

In many traditional computational linguistics systems, similarity graphs can be very difficult for users to edit. A user might, for example, adjust a list of stop words, or words that are excluded from the similarity analysis. But it can be very difficult for users to identify every word that might be contributing a relationship in the graph that they wish to suppress or enhance. Further, many systems are relatively slow to respond to such edits due to the computational resources consumed when re-calculating edge weights. Some embodiments may mitigate these problems and others described below, though embodiments are not limited to systems that address these problems, as multiple, independently useful inventions are described herein.

To facilitate graph manipulation, some embodiments may expand on user edits to the graph to make such edits more closely accord with the user's intent. If for example, the cluster (or underlying graph) is not meaningful or is otherwise undesirable to a user, then the user may, in some use cases, disperse the cluster (or re-configure the underlying graph) such that the nodes are forced to form new clusters or connections. In some use cases, the user may cause embodiments to create new clusters by providing custom terms (e.g., n-grams) to the embodiment. In some embodiments, user input with the computing system may thus cause modification of the similarity graph, including creation of new clusters of documents or dispersion of existing clusters of documents.

In some cases, the above-described edge weights may be increased (e.g., linearly, logarithmically, etc.) as a result of a pair of documents having an identified n-gram, i.e., the term may be emphasized. Or in some cases, edges weights may be decreased (e.g., linearly, logarithmically, etc.), i.e., the term may be deemphasized. Or such expansion terms may have other uses, such as query suggestion or expansion terms. In some cases, the user input may include of a plurality of terms, and in some cases, the amount of emphasis/de-emphasis may be determined by a second user input.

For example, some of the above-mentioned problems with traditional techniques for adjusting semantic similarity graphs (e.g., which may exist in memory as an intermediate data structure or may be displayed to users, e.g., in force directed graph representations) may be mitigated by the techniques described herein. Some embodiments may allow users (or other pipelined applications) to provide n-grams indicating which relationships in an extant similarity graph are to be enhanced or suppressed, e.g., either significant (e.g., a "whitelist" term) or insignificant (e.g., a "blacklist" term) terms. Whether enhancing or suppressing, some embodiments may algorithmically expand the user-provided terms by identify conceptually related expansion terms. Further, some embodiments may emphasize the significant terms or deemphasize the insignificant terms, including emphasis or de-emphasis of the expansion terms. The combination of expanding terms and emphasizing/deemphasizing enables creation or dispersion of clusters of documents containing these terms based on the adjustment of their significance, among other use cases.

In a corpus of news, for instance, if a user were to want to deemphasize or emphasize the topics related to the term "war," something very similar would ideally occur as well if the user had instead used the term "conflict." Because it is difficult to manually introduce all the terms related to a concept, let alone taking into account hidden associations between terms and topics, there is an unresolved need for an automatic method of finding the most related terms to an input (e.g., user-supplied) set of terms and providing the opportunity to use those terms too.

In commercially relevant scale, the documents can be many, e.g., 1000 or more. The relative n-grams of all documents can be many, e.g., 100,000 or more. The user-input n-grams may be many, but complex operations can arise from even relatively few, e.g., on the order of 1 to 10. At such scales, using the present techniques, a user may 'influence' the semantic graphs based on n-grams (or other method for topic modeling) when they believe that certain keywords are generating the wrong semantic graph.

Figure 2:
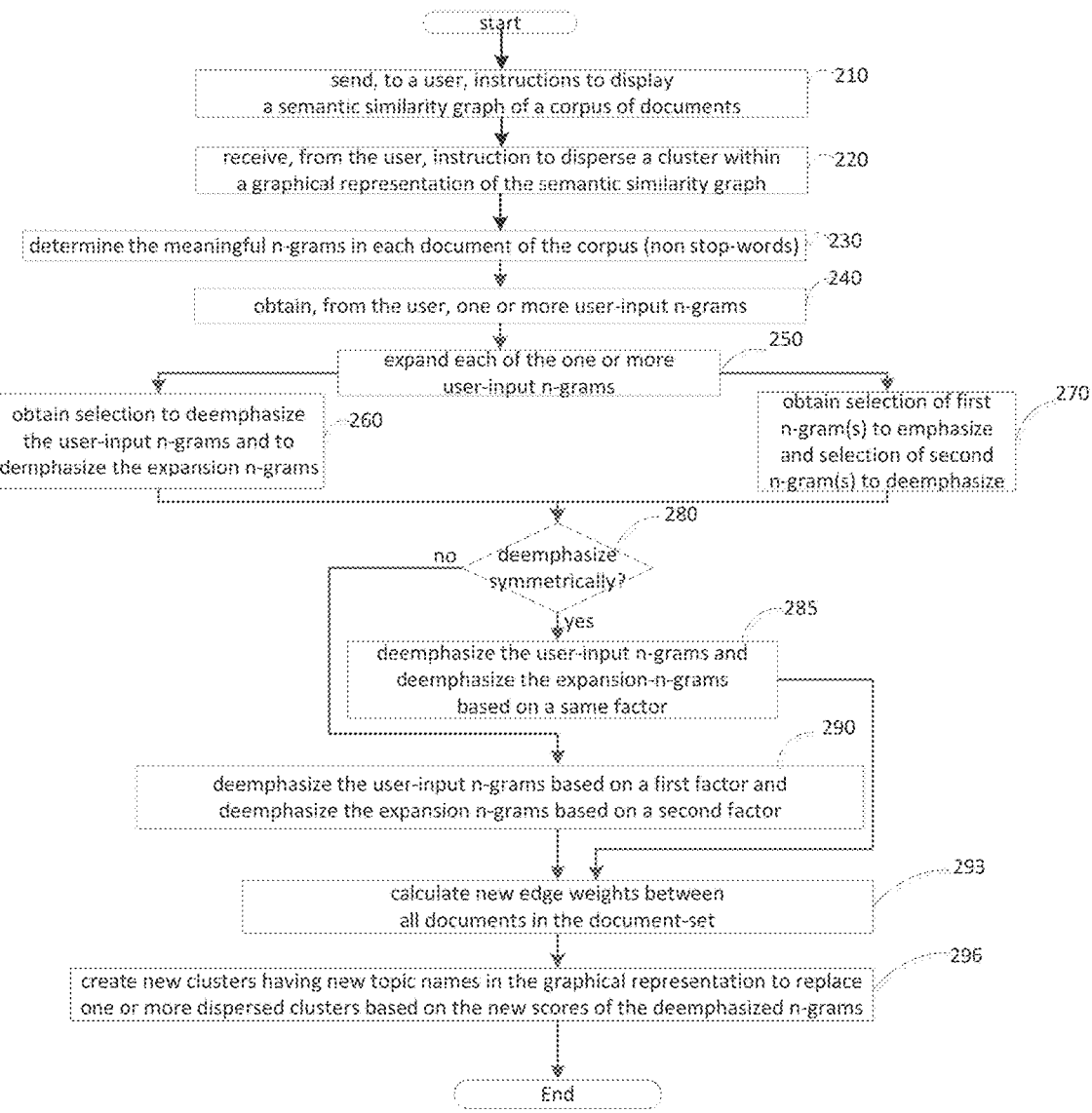
FIG. 2 is a flow chart of an example of a process for dispersing an existing cluster in a clustered (graphical) representation of a semantic similarity graph.

FIGS. 1 and 2 are flow charts depicting an example of a process for a semantic similarity graph. The term "adjusting" includes, by way of example, both changing an extant data structure and recalculating the data structure to form a new instance. In some embodiments, the process of adjusting clusters may be stored on a tangible, non-transitory, machine-readable media such that when the instructions are executed by a data processing apparatus, like one or more of the computers described below with reference to FIG. 9, the operations of the processes in FIGS. 1 and 2 are effectuated. In some embodiments, the processes in FIGS. 1 and 2 may be performed by a component of a computational linguistics system described below with reference to FIG. 8, e.g., executing on the computer system described with reference to FIG. 9. Examples of the processes in FIGS. 1 and 2 may yield graphical representations on a user device, like those described below with reference to FIGS. 6 and 7. In some embodiments, an instance of the processes in FIGS. 1 and 2 may be executed server-side for each session with an individual remote user interfacing with the server via a client computing device, for example, over the Internet. Thus, in some cases, a relatively large number of instances of the processes in FIGS. 1 and 2 may be ongoing concurrently, for instance, more than 100 or more than 1000 instances operating concurrently, each instance serving a different user session.

Some embodiments modify an extant document semantic similarity graph by indicating n-grams (terms) to emphasize or deemphasize (or eliminate) when gauging the similarity of documents. The n-grams may be identified based on a user-supplied set of n-grams that are expanded (e.g., new corresponding terms are generated) to include related terms that enhance the desired effect. Some embodiments may obtain a semantic similarity graph of documents and an n-gram from which the user wishes to change an effect in the document graph (e.g., increasing or decreasing the effect, either linearly with weights or non-linearly, like with a log function). In response, some embodiments may identify related terms based on the text of the documents. In particular, some embodiments may identify related terms based on 1) the rate of co-occurrence with the user-input term; and 2) the rate of occurrence in the corpus outside of the documents where the user-input term co-occurs. Some embodiments may calculate a score based on these values for each candidate term, e.g., based on a ratio similar to a form of TF-IDF, like BM25. Some embodiments may then re-calculate the document semantic similarity graph with new edge weights that are based, in part, on whether a term was identified in this expansion of terms to be emphasized or deemphasized.

The emphasization or de-emphasization of relationships can happen with the user introduced n-grams, in some cases without expansion. But as noted above, users are often not capable of identify the n-grams needed to give effect to their intent. Some embodiments expand the concepts represented by user input n-grams to make the pair-wise similarities even more effective. In some embodiments, these expansion terms are presented to the user, or the user may never know that the method used involves additional n-grams, they only provide their own n-grams to blacklist (or whitelist).

Some embodiments may disperse clusters of document graphs. Dispersion may be performed by deemphasizing the importance of n-grams in documents of the cluster to be dispersed. Other embodiments may generate their own (custom) similarity clustering taxonomy, e.g., by creating new clusters (or emphasizing an existing cluster) via the emphasizing of certain terms in documents. Still other embodiments may allow for the combination of these two methods, i.e., dispersion and creation of clusters. Some embodiments may operate without regard to whether a document similarity graph is subject to further processing to cluster nodes.

Some embodiments may obtain a semantic similarity graph and receive input identifying a cluster to be dispersed (e.g., by a user clicking on it in a visual display of the graph, as a result of the user making a decision to disperse a cluster based on undesirable topics or terms). Some embodiments may grow a repository of stop-words by receiving user-input and incorporating into the repository a list of undesirable n-grams (e.g., specific n-grams the user does not care about and would prefer deemphasized). Some embodiments may create a repository of desirable n-grams (or adding to an existing repository) comprising n-grams received from user-input (e.g., specific n-grams the user cares about and would prefer emphasized).

Some embodiments may adjust the edge-weights between documents in a semantic similarity graph. When n-grams of certain documents are deemphasized their score decreases in effect (e.g., their score is cut in half, by a quarter, by a tenth, or is entirely reduced to zero, or their score may increase in systems where higher scores indicate a weaker relationship), resulting in potentially dramatic effects in the vector-representations of documents (e.g., derived by translating the document into a "bag-of-words"). These deemphasized n-grams can be expanded in some embodiments to enhance the effect of de-emphasis. A user supplying these n-grams may not be cognizant of all insignificant n-grams. For example, a certain document may contain some boiler plate language including similarly unimportant (e.g., irrelevant, undesirable, stop-words, etc.) n-grams that co-occur with the user-supplied n-gram resulting in the maintenance of undesirable clusters.

In embodiments where the n-grams of certain documents are deemphasized, a system may obtain a set of insignificant n-grams and identify n-grams within a set that co-occur with the user-supplied n-grams. The identified n-grams may then be ranked in order of their number of times co-occurring. The top x (x being a natural number) n-grams in the ranked order that co-occur with the user-supplied n-gram a number of times above a threshold (or score, e.g., predetermined or dynamically determined by a user or processor) may be identified. The system may then remove the identified, top x n-grams from a list of candidate expansion n-grams. In other embodiments, instead of removing the identified, top x n-grams, the identified top x n-grams may have their importance (score) decreased or diminished. The result is that a user may break up a cluster without identifying every n-gram that binds it together.

When n-grams of certain documents are emphasized their score increases (e.g., their score is doubled, multiplied by 5 or by 10, etc.), resulting in desirable effects in the vector-representations of documents, in the resulting semantic similarity graphs, or in the graphical representations of semantic similarity graphs. These emphasized n-grams can be expanded in some embodiments to enhance the effect of emphasis. A user supplying these n-grams may not be cognizant of all important n-grams. For example, a certain document may contain some verbiage including similarly significant (e.g., important, relevant, desirable, etc.) n-grams that often appear when the user-supplied n-gram co-occurs, which could result in the creation of new clusters.

An implementation of embodiments where certain n-grams of a set of documents are emphasized may include obtaining a set of unique n-grams of the set of documents and scoring the unique n-grams within that set of documents based on a number of times each unique n-gram co-occurs with the user-supplied n-gram. The highest scoring n-grams are then identified. The top y (y being a natural number) n-grams in a ranked order of the identified n-grams are identified, having a co-occurrence above a numerical threshold (or score, e.g., predetermined or dynamically determined by a user or processor). From a list of candidate expansion n-grams (e.g., the original set of unique n-grams) is then selected the identified, top y n-grams. The identified top y n-grams may have their importance (score) increased (emphasized). The result is that a user may create a cluster without identifying every n-gram that might bind together with the user-supplied n-gram.

In some embodiments, the semantic similarity graph is recalculated, edge-weights are modified, or clusters are adjusted when new documents are added to a corpus, due to the change in the number of co-occurrence of terms.

In some embodiments, as in a semantic similarity graph when determining edges, one can generalize to features, e.g., in images.

Some embodiments have a cascading effect on other types of analysis, e.g., on sentiment analysis or on various lenses.

Some embodiments recursively identify expansion terms for a few iterations by feeding generated expansion terms back into the expansion process. For example, a user may supply the n-gram "solar" and the n-gram "photvoltaic" might be determined as an expansion term, and the heuristic or the algorithm may then input this newly generated expansion term back in to determine that "battery" is an expanded n-gram of "photovoltaic". Since this process might undergo 2-3 iterations, the system may in some implementations apply more stringent thresholds at higher degrees of separation. In some cases, expansion terms do not contain the input n-gram, in contrast with existing techniques, such as stemming.

In some embodiments, the user may decide to both create a cluster and disperse an existing one with one set of user-input term(s). For example, some embodiments may support two use cases. In the first one, a user may introduce a set of words to be deemphasized and/or a set of words to be emphasized. In the second case, the user wants to include, not only the manually user-supplied words set, but also the terms that are closely related to them. In some embodiments, the number of user-supplied (input) terms varies. For example, the user may supply (for expansion and emphasis or de-emphasis) one n-gram, more than one n-gram, more than five n-grams, etc.

Below is an example of a process to identify related n-grams (e.g., expansion n-grams). In order to identify related n-grams, some embodiments use statistical methodologies that take into account the co-occurrence of n-grams in the same documents of the corpus. In some embodiments, the input is a corpus of text and a set W of n-grams w introduced by the user. Some embodiments may count the number of times N(a) that all the n-grams a in the corpus occur in the corpus itself. Second some embodiments compute the length L(d) of each document d in the corpus. After some embodiments have both of this information, it is possible to calculate the probability to observe an arbitrary number of times k(a,d) the word a in the document d. In order to accomplish this task, some embodiments use the hypergeometric distribution. One of the features of this distribution is that it takes into account the extraction without replacement; namely, once a word is extracted the probability to be extracted again decreases (e.g., we have less word of that kind in the "ballot").

In some implementations, the probability mass function of a random variable following a hypergeometric distribution may be given by the following exemplary formula:

$$P(k(a,d)) = \frac{\binom{N(a)}{k(a,d)}\binom{W-N(a)}{L(d)-k(a,d)}}{\binom{W}{L(d)}}$$

However, if this hypothesis is relaxed, allowing for a constant probability, which does not decrease every time a word is extracted, then the Poisson distribution may be used, in which the probability of extracting a certain element (e.g., an n-gram) is constant across all the samples. In this case the previous formula can be approximated to:

$$P(k(a,d)) = \frac{\lambda^{k(a,d)} e^{-\lambda}}{k(a,d)!}$$

where $\lambda = N(a)/W$. This is the probability that choosing a random n-gram from the corpus, a will be extracted.

That is, the present disclosure contemplates different models where different distributions can be used according to the assumption of extraction with or without replacement. The method may be robust to these variations because it leverages on extensive corpora of text. The performance may be worse the shorter the documents are and the smaller overall the corpus is.

Clarifying the concept of co-occurrence (and with it the concept of joint probability), in an example document, two n-grams x and y co-occur if they appear in the same document and the joint probability is the ratio between the number of documents that contains both x and y and the total number of documents. So, if in each document both x and y are always present, then the joint probability may be 1, while if they never co-occur the joint probability may be 0. The conditional probability of observing y given x may be calculated, e.g., by dividing the joint probability by the probability of x.

$$p(y\,|\,x) = \frac{p(x\,|\,y)p(y)}{p(x)} = \frac{p(x\,\&\,y)}{p(x)}$$

If x is one of the user-supplied n-grams the conditional probability of all the other n-grams with respect to it may be calculated. However, because some n-grams are naturally more frequent than others, this effect may be taken into account because otherwise the conditional probability would be dominated by stop-words (or n-grams like stop-words), such as with the probability of seeing the n-gram "the" given any other n-gram being very high. A benefit therefore of probabilities being calculated with the hypergeometric distribution is that they will constitute a baseline for n-gram occurrence in the document and represent the count if the n-grams are randomly distributed across all the documents. (Though, as noted, other distributions and other techniques may be used.)

In certain implementations, "virtual" documents may be generated, i.e., documents where the words occur according to the values calculated with the probability distribution. By comparing the conditional probability of the real n-grams co-occurrence in the documents with the ones generated by the distribution we can evaluate the real relationship between n-grams by discounting the contribution that we would have obtained with a totally random distribution of n-grams. For instance, naturally frequent words such as articles, that would have a very high conditional probability (e.g., the probability to observe "the" in the same document with every other word is very likely), will be ranked very low because they would have co-occurred frequently even in the case of random word extraction.

There is another advantage to use a distribution as a benchmark, and it is the possibility of using confidence level (though not all embodiments afford this advantage). The comparison between real conditional probability and the benchmark can be done using the most likely values from the distribution or stretching those values to one extreme of the distribution imposing an arbitrary p-value. A given implementation would be enabled to adjust a parameter (the p-value) for inferring related (expansion) n-grams spanning from conservative to more flexible paradigms.

This methodology may also be improved by computing not only the conditional probability of finding y along with x in documents, where x is the user (custom) introduced word, but also the probability to find x given y. In this way, the system may better estimate if the relationship between the two n-grams is not one-way but reciprocated. The multiplication of the two probabilities may be a way to calculate this symmetric relationship (but other methodologies may be equally valid):

$$p(y\,|\,x)p(x\,|\,y)$$

The output of this method may be a ranked list of n-grams related to the one under investigation. The rank may be given, e.g., by the difference between the conditional probability of the real documents and the one computed with the probability distribution. The system may then identify the top n scores (where n is a natural number) or establish a threshold to define the related (expansion) n-grams set. In case of multiple input words, one embodiment may take the union set. In other embodiments, the system may take the intersection or another combination of them.

Some embodiments ingest multiple user-supplied n-grams and generate multiple sets of expansion terms. Some embodiments may detect duplicates among these sets and remove the duplicates, or some embodiments may adjust the effect that duplicate entries have, e.g., decreasing or increasing the effect of each marginal instance. In some cases, one of the related (expansion) n-grams for a first user-supplied n-gram is the same as one of the related (expansion) n-grams for a second user-supplied n-gram. For example, if the user supplies "solar" and "battery," and both expand to produce the term "photovoltaic," some embodiments will only adjust weights for "photovoltaic" once (e.g., by de-duplicating to remove duplicate related (expansion) n-grams) whereas other embodiments will adjust the weighting for this n-gram twice.

Some embodiments emphasize and deemphasize n-grams. In some embodiments, presence of the expansion n-grams affects the methodology, meaning just that the significance of not only the user introduced n-grams but also the expansion n-grams are modified. Certain embodiments account for the fact that an n-gram is an expansion n-gram and not a user introduced one by differently weighting the amount of significance correction. For instance, if the user-supplied n-gram is "war" and one of the expansion ones is "conflict," then the score of "war" will be deemphasized/emphasized by a factor of 1 while the score of "conflict" may have a different score. This can be either a constant value (e.g., all related words have a factor of 0.5) or some measure representing the conditional probability with the original n-gram.

When analyzing a text, some embodiments score each n-gram based on a form of TF-IDF, a family of formulas that generally take into account the frequency of an n-gram within the document (Term Frequency) and in the entire corpus (Inverse Document Frequency) or other sample of documents. Depending on whether the system determines that the n-gram is to be emphasized or deemphasized, some embodiments modify this score by increasing or diminishing its value. For example, in the case of deemphasized n-grams, the score may be decreased. Different strategies can be used. In some implementations, all of the stop-words, including the n-grams to be deemphasized, are set to have a score of zero. In another implementation, the score can be modified by a certain factor or to adjust (e.g., add, subtract, multiply, or divide) based on a constant value. Zero is a natural lower bound for the TF-IDF score but some embodiments support implementations in which even a negative score could be used.

Some embodiments may form a feature vector for each document, where each term in the feature vector is a cardinal value indicating the presence of a particular n-gram. In some cases, the feature vector is an ordered list of TF-IDF scores for corresponding n-grams. In some cases, the feature vector is an ordered list of BM25 scores.

In some embodiments, n-grams to be emphasized may have their score adjusted, e.g., a weighting coefficient may be multiplied by the corresponding value in the feature vector for each document (e.g., 0.9 or 0 to decrease, or 1.1 to increase). In some cases, the difference is that the score will be increased instead of decreased when deemphasized. Also in this case different strategies can be used (e.g., multiplying by a factor, adding a constant value, etc.). Unlike the deemphasized n-grams or stop-words, for n-grams to be emphasized there is no natural upper-bound, i.e., the score can be potentially infinite. In some implementations, the score of an n-gram to be adjusted (e.g., emphasized) is set to the maximum score of all scores within a document. In this way, the importance of emphasized n-grams is increased to the level of the most important n-gram in the document. Such a modification of the scoring may be helpful in the next steps of the text analysis that comprises topic extraction (via generative models such as linear discriminant analysis (LDA) or dimensionality reduction like principal component analysis (PCA) or singular value decomposition (SVD)). The extracted topics may be more biased toward the emphasized words, while topic formation will be discouraged, if not totally prevented, for deemphasized words.

Some versions of the present techniques afford certain advantages. Stop-word lists are often broad enough to be universally applied but for the same reason they are unable to capture the peculiar aspects of specific fields. Also, some embodiments provide the opportunity not only to deemphasize an n-gram, but to enhance the importance of others. This is expected to give flexibility and improved control on the topic extraction from a corpus of text. Some embodiments identify n-grams that are related and that consequently are part of the same concept. Some embodiments improve on typical stemming and n-grams variations by relating n-grams on a statistical basis, giving the opportunity to find one or more conceptual, non-trivial connections that were otherwise unknown to the user. That said, not all embodiments afford all of these benefits, as several independently useful inventions are described.

Some embodiments disperse or form of clusters based on direct feedback of the user, who influences the topic model by adjusting the significance of certain n-grams and or groups of n-grams. Users otherwise would not have any way of interacting with or improving the results in a semantic similarity graph provided to them.

Being able to parse and analyze large amounts of unstructured data, often in the form of plain text, is of crucial importance for companies, institution, and organizations in all fields. The goals span from better understanding the state of the art of a certain vertical to gain information for improving market strategies. Given the large amounts of data, the best way to analyze text is in an automated way. However, given the extreme variability of the field that has to be investigated, the need of more customization in the analysis is becoming a dominant factor when choosing the algorithm to use. With the presently disclosed methodology there is opportunity to steer away from a fixed framework and its constraints in favor of a more flexible rationale where the user has more control over the textual features to emphasize or deemphasize. This may result in a greater fit to each field and a consequent optimization of the information extraction. In an example parsing, currently there is no guarantee that the topic will reflect the user-supplied n-grams and in fact it can be biased toward other unrelated features such as geographical locations or other side topics.

In the present disclosure, though, a system promotes the formation of topics toward a supplied n-gram and an expansion n-gram by enhancing their importance in the text or by lowering the score of other textual features. This results in a better information extraction, matching the need of a specific use case.

The present disclosure takes into account the topology of the semantic similarity graph (a network). With respect to clusters (e.g., communities) of documents in a graph, n-grams to be deemphasized or emphasized can be used to explicitly discourage or promote the formation of such clusters. For instance, the user may want to destroy a cluster while keeping the documents in it, which will individually migrate and attach to other, already formed clusters (or newly formed clusters). Various embodiments presented herein are computationally efficient, as it is often enough to select the most common n-grams of that cluster to significantly discourage the formation of that cluster. The remaining n-grams in the documents will create connections with other document nodes in the graph. Conversely, the formation of new clusters can be promoted by selecting common n-grams among a set of documents that will have more chances to form a densely connected cluster (clique). Also, introduction of a customized taxonomy may form completely new clusters. The keywords extracted from a graph (like the representative n-grams for the clusters) can be used to bias the formation of similar clusters in a totally different set of documents enhancing opportunities for comparisons among corpora.

Some embodiments may employ metadata of a corpus to select terms to be emphasized or terms to be deemphasized, e.g., in a new network and some data that is desirable to bring up; in other words, a creation of a taxonomy on the fly. If for instance a user desires enhancing connectivity among documents within an industry sector, if such a sector is present in the corpus as a tag category (supervised learning), then it may be possible to emphasize or deemphasize the connections around that vertical. Even if the information is not explicitly present it is contemplated to use statistical methods in semi-supervised or unsupervised machine learning to infer the categories and, from there, extract the typical words that will populate the list.

FIG. 1 is a flow chart of an example of a process for creating a new cluster in a clustered (graphical) representation of a semantic similarity graph. In this flow chart, at operation 110, a system (e.g., a server device) may display, to a user (e.g., of a client device), a cluster-graph of a corpus to adjust. In other words, the system may send, to a user, instructions to display a semantic similarity graph of a corpus of documents that is to be adjusted, each node in the graph corresponding to a document. Or some embodiments may apply white-list or blacklist n-grams to edit a graph without expanding.

At operation 120, some embodiments may obtain, e.g., from the user, a first selection to create a new cluster based on the topics of one or more clusters in the cluster-graph (e.g., a graphical representation of a semantic similarity graph). The semantic similarity graph may be a node-graph, each node of the node-graph comprising a document (vector). In some cases, this operation may include receiving instruction, from the user, to create a cluster within a graphical representation of the semantic similarity graph. One way to display a semantic similarity graph to be modified is therefore to display a clustered representation.

In some embodiments, the process may automatically expand on a set of user-supplied n-grams. Or some embodiments may only expand on the user supplied set of n-grams in some cases, e.g., in response to a user command to this effect. Some embodiments may include a decision of "expand set?" between blocks 120 and 130, and continue with the process as illustrated if the answer is "yes," or jump to block 193 and proceed with just the user-supplied n-grams.

At operation 130, some embodiments may score each unique n-gram of each document. In this operation, the system may determine the meaningful (i.e., at least not the stop-words found in each document) n-grams in each document of the corpus. This operation further may include parsing the entire document of every document in a corpus, which could number hundreds, thousands, or even tens of thousands of documents (or more).

At operation 140, the system may obtain, from the user, one or more user-input n-grams.

At operation 150, the system may expand each of the one or more user-input n-grams. An example of this expansion is provided with reference to FIG. 3.

At operation 160, the system may obtain, from the user, a selection to emphasize the user-input n-grams and to emphasize the expansion n-grams. In this operation, the system emphasizes (or additionally deemphasizes) just the user-input terms in some embodiments, but in other embodiments emphasizes both the user input terms and the expansion terms.

At operation 170, the system may obtain, from the user, a selection of first n-gram(s) to emphasize and a selection of second n-gram(s) to deemphasize.

At operation 180, the system may determine (e.g., by further user-input, by default, or by dynamic configuration of a processor) whether to emphasize symmetrically. If the decision is to emphasize symmetrically, then operation 185 is performed; otherwise, operation 190 is performed.

At operation 185, the system may emphasize the user-input n-grams and may emphasize the expansion n-grams based on a same factor (e.g., a predetermined one or as is dynamically determined by user input or processor activity).

At operation 190, the system may emphasize the user-input n-grams based on a first factor and emphasize the expansion n-grams based on a second factor.

At operation 193, whether arriving there after performing operation 190 or operation 185, the system may calculate new edge weights (e.g., between all documents in the corpus containing the user-input n-grams or the expansion n-grams).

At operation 196, some embodiments create a new cluster having a new topic name in the graphical representation based on the new scores of the emphasized n-grams (and any deemphasized n-grams). Additionally, in this operation, a system may (with or without human input) extract a topic for each cluster of documents (or for each document) based on the adjusted significance (e.g., emphasized) of the n-grams in the corresponding documents that match identically or relate conceptually with a user-supplied one.

FIG. 2 is a flow chart of an example of a process for dispersing an existing cluster in a clustered representation of a semantic similarity graph. In this flow chart, at operation 210, the system may send, to a user, instructions to display a semantic similarity graph of a corpus of documents. The system may also receive from the user (optionally) an amount of de-emphasis (e.g., if not a default amount).

At operation 220, some embodiments may receive, from the user, instruction to disperse a cluster within a graphical representation of the semantic similarity graph.

At operation 230, some embodiments determine the meaningful n-grams in each document of the corpus (i.e., at least not the stop-words found in each document).

At operation 240, some embodiments obtain, from the user, one or more user-input n-grams.

At operation 250, some embodiments expand each of the one or more user-input n-grams. An example of this expansion is provided with reference to FIG. 3.

At operation 260, some embodiments obtain, from the user, a selection to deemphasize the user-input n-grams and to deemphasize the expansion n-grams. In this operation, the system deemphasizes (or additionally emphasizes) just the user-input terms in some embodiments, but in other embodiments deemphasizes both the user input terms and the expansion terms.

At operation 270, some embodiments obtain selection of first n-grams to emphasize and selection of second n-grams to deemphasize.

At operation 280, some embodiments determine (e.g., by further user-input, by default, or by dynamic configuration of a processor) whether to deemphasize symmetrically. If the decision is to deemphasize symmetrically, then operation 285 is performed. Otherwise, operation 290 is performed.

At operation 285, some embodiments deemphasize the user-input n-grams and deemphasize the expansion-n-grams based on a same factor.

At operation 290, some embodiments deemphasize the user-input n-grams based on a first factor and deemphasize the expansion n-grams based on a second factor.

At operation 293, whether arriving there after performing operation 290 or operation 285, some embodiments calculate new edge weights (e.g., between all documents in the corpus, or between all documents in the corpus containing the user-input n-grams or the expansion n-grams). In some cases, edge weights between documents not containing the expansion n-grams remain unchanged.

At operation 296, to replace one or more dispersed clusters based on the new scores of the deemphasized n-grams (and any emphasized n-grams), the system may create one or more new clusters (or the nodes from the one or more dispersed clusters may join existing clusters) having new topic names in the graphical representation. Additionally, in this operation, a system may (with or without human input) extract new topics for each new cluster of documents (or for each document) based on the adjusted significance (e.g., deemphasized) of the n-grams in the corresponding documents that match identically or relate conceptually with each user-supplied one.

Figure 3:
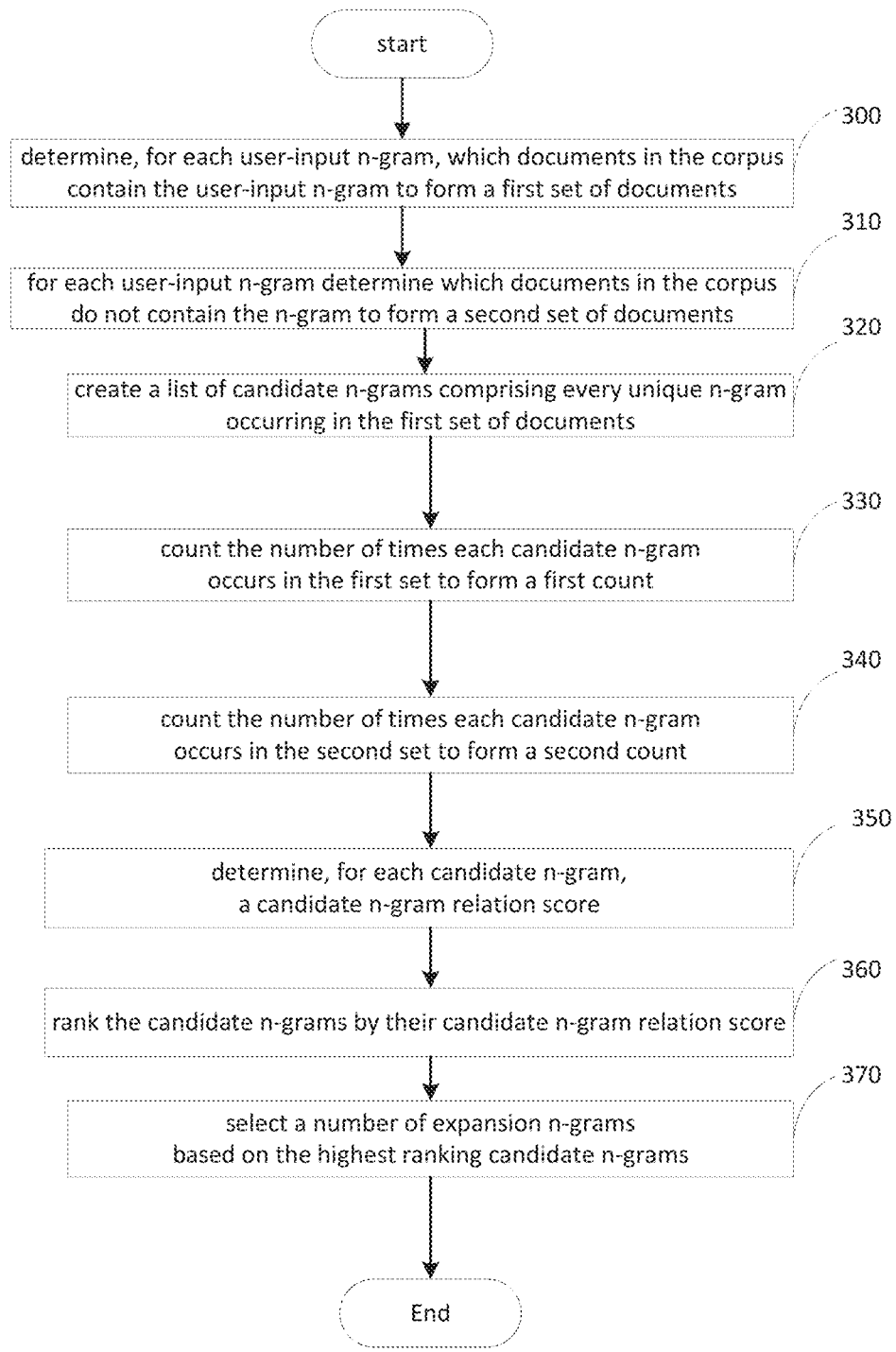
FIG. 3 is a flow chart of an example of a process for expanding an n-gram into a plurality of n-grams based on n-grams from a set of documents containing the n-gram.

FIG. 3 is a flow chart of an example of a process for expanding an n-gram into a plurality of n-grams based on n-grams from a set of documents containing the n-gram.

At operation 300, some embodiments determine, for each user-input n-gram, which documents in the corpus contain the user-input n-gram to form a first set of documents or determine, for each user-input n-gram, which documents in the corpus have a high probability of containing the user-input n-gram to form the first set of documents. In some use cases, the rationale for organizing into the first set of documents is to leverage the hypothesis of Distributional Semantics. In some embodiments, the corpus of documents used to create the semantic similarity graph is not the same corpus as the one used in these operations to expand the user-supplied (e.g., user-input) n-gram but in other embodiments the corpus is the same.

At operation 310, some embodiments determine, for each user-input n-gram, which documents in the corpus do not contain the n-gram to form a second set of documents or determine, for each user-input n-gram, which documents in the corpus do not contain any of the user-input n-gram to form the second set of documents.

At operation 320, some embodiments create a list of candidate n-grams comprising every unique n-gram occurring in the first set of documents.

At operation 330, some embodiments count the number of times each candidate n-gram occurs in the first set to form a first count (certain key words may naturally have a higher count).

At operation 340, some embodiments count the number of times each candidate n-gram occurs in the second set (or in the full corpus) to form a second count.

At operation 350, some embodiments determine, for each candidate n-gram, a candidate n-gram relation score. For example, the candidate n-gram relation score may be calculated by dividing (or multiplying) the first count by the second count. This operation is not limited to this example, which is not to imply that any other example is limiting. The present disclosure contemplates alternative techniques for generating a score other than calculating a linear ratio, e.g., logarithmically, akin to the difference between TF-IDF implementations and BM25, as described below, or via other suitable functions.

At operation 360, the system may rank the candidate n-grams by their candidate n-gram relation score.

At operation 370, the system may select a number of expansion n-grams based on the highest ranking candidate n-grams. For example, the selection of expansion n-grams may be based on a score being greater than a certain threshold or greater than a predetermined number or a dynamically determined number by user input or processor activity. Too long of a delay in selecting an expansion n-gram could be problematic for the user of the system that sent instructions for displaying the semantic similarity graph and who prefers to adjust the graph for readability purposes in a short period of time. In some cases, expansion n-grams are selected within 30 seconds, and in some embodiments, within five seconds of a user request.

In some embodiments, the expansion of terms may be based on a distribution and a conditional probability whereas other embodiments may be implemented as is shown in FIG. 3 (e.g., where the expansion n-grams are determined deterministically). As a result, one or more of the ways of adjusting semantic similarity graphs, as disclosed herein, can be performed (by the one or more processors of the embodied system) relatively quickly.

Figure 4:
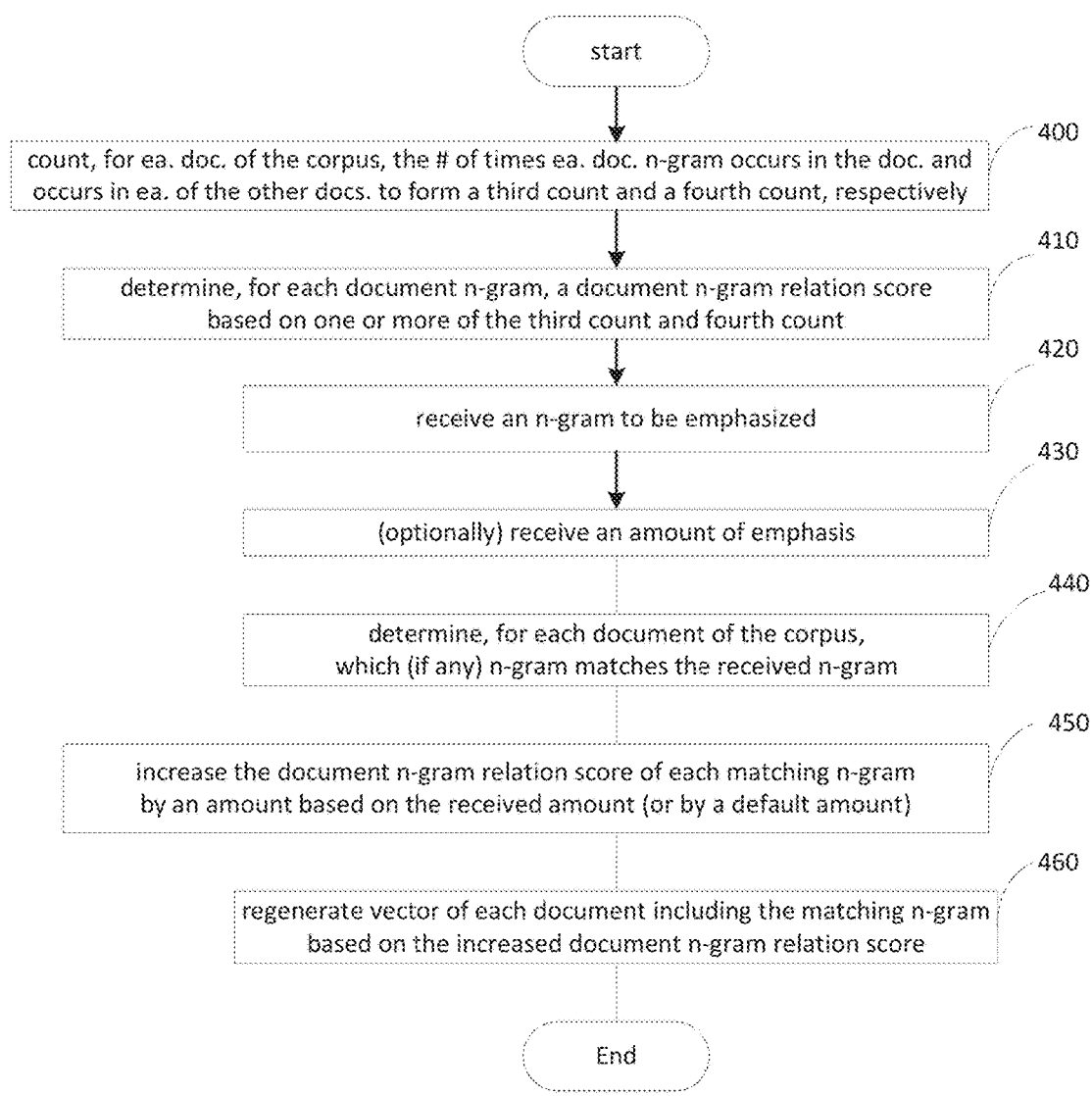
FIG. 4 is a flow chart of an example of a process for emphasizing the significance of an n-gram within a document (vector) by numerically increasing its score.

FIG. 4 is a flow chart of an example of a process for emphasizing the importance of an n-gram within a document vector by numerically increasing its score.

At operation 400, some embodiments count, for each document of the corpus, the number of times each document n-gram occurs in the document and occurs in each of the other documents to form a third count and a fourth count, respectively.

At operation 410, some embodiments determine, for each document n-gram, a document n-gram relation score, e.g., by multiplying the third count by the fourth count.

At operation 420, some embodiments receive an n-gram to be emphasized.

At operation 430, some embodiments receive an amount of emphasis.

At operation 440, some embodiments determine, for each document of the corpus, which (if any) n-gram matches the received n-gram.

At operation 450, some embodiments increase the document n-gram relation score of each matching n-gram by an amount based on the received amount (or by a default amount).

At operation 460, some embodiments regenerate the vector of each document including the matching n-gram based on the increased document n-gram relation score.

Figure 5:
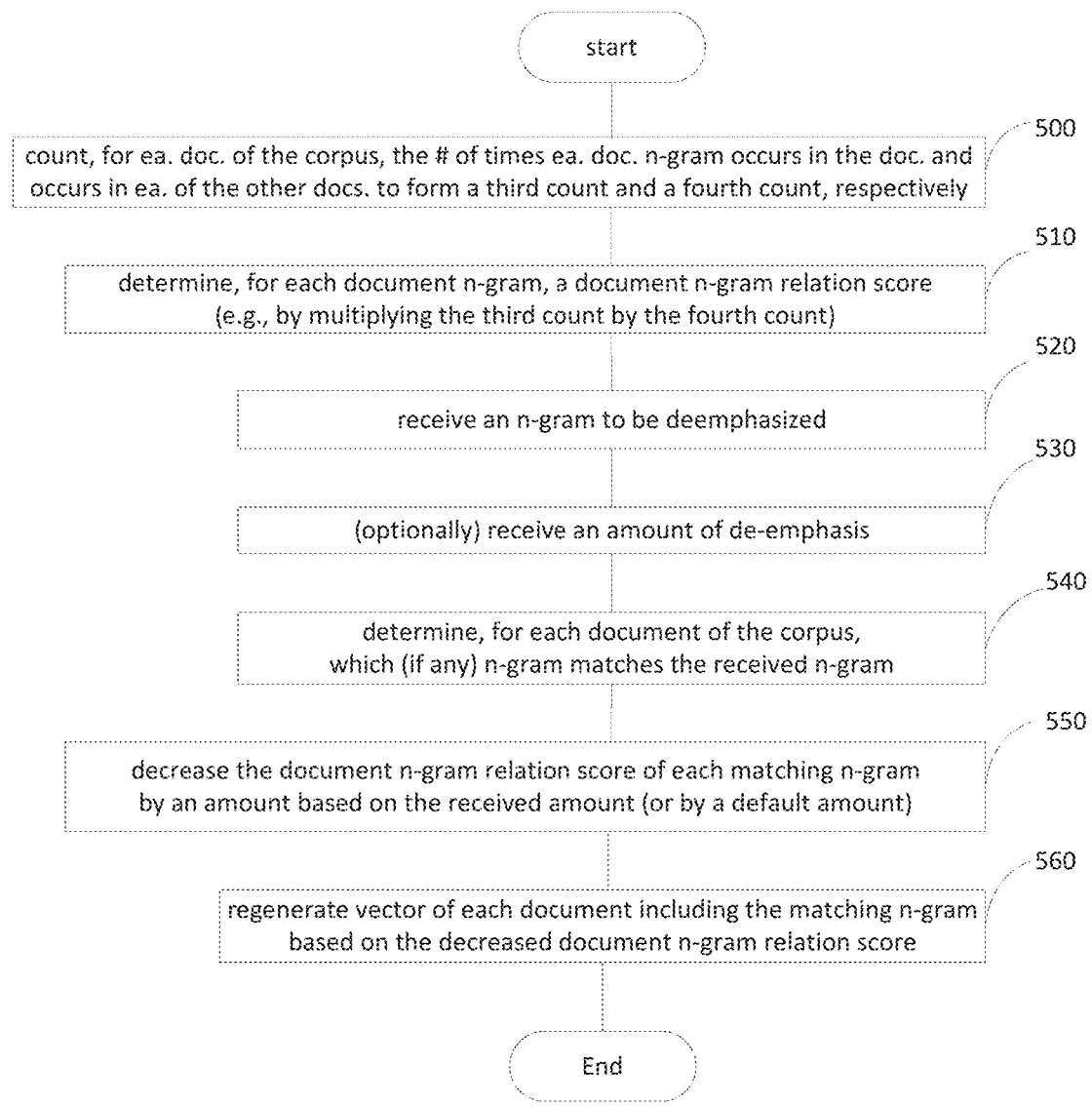
FIG. 5 is a flow chart of an example of a process for deemphasizing the significance of an n-gram within a document (vector) by numerically decreasing its score.

FIG. 5 is a flow chart of an example of a process for deemphasizing the importance of an n-gram within a document vector by numerically decreasing its score.

At operation 500, some embodiments count, for each document of the corpus, the number of times each document n-gram occurs in the document and occurs in each of the other documents to form a third count and a fourth count, respectively.

At operation 510, some embodiments determine, for each document n-gram, a document n-gram relation score, e.g., by multiplying the third count by the fourth count.

At operation 520, some embodiments receive an n-gram to be deemphasized.

At operation 530, some embodiments receive an amount of de-emphasis.

At operation 540, some embodiments determine, for each document of the corpus, which (if any) n-gram matches the received n-gram.

At operation 550, some embodiments decrease the document n-gram relation score of each matching n-gram by an amount based on the received amount (or by a default amount).

At operation 560, some embodiments regenerate the vector of each document including the matching n-gram based on the decreased document n-gram relation score.

To select expansion n-grams, some embodiments may determine which n-grams co-occur relatively frequently with the input n-gram within the corpus, or within some other corpus. In some embodiments, this frequency may be normalized based on a frequency with which the terms occur more generally, for example, without regard to whether the terms co-occur within a document. In some embodiments, upon receiving an n-gram indicating the types of relationships to be enhanced or suppressed, some embodiments may determine which documents in a corpus contain the n-gram and which do not. Some embodiments may determine which terms occur relatively frequently in one of the sets of documents but not the other and infer that such terms are conceptually related to the input n-gram, causing the terms to be added to a set of expansion terms. In some embodiments, the corpus by which related terms are identified may be different from a corpus reflected in a semantic similarity graph, or the corpus may be the same or overlapping.

Embodiments may use a variety of techniques to determine whether terms are conceptually related. Some embodiments may identify candidate n-grams from the set of documents including the input n-gram. In some embodiments, the candidate n-grams are each unique n-gram (e.g., up to some threshold, like two, three, four, or five terms) occurring within the document set including the input n-gram. Some embodiments may calculate a score for each of the candidate n-grams indicating a strength of relationship between the candidate n-gram and the input n-gram.

To calculate the score, some embodiments may determine an amount of occurrences of each candidate n-gram in the documents set including the input n-gram. In some embodiments, the amount is a count. In other embodiments, the amount is a frequency, such as a count of occurrences of the candidate n-gram in the documents set divided by a total number of n-gram in the documents set. In some cases, the number of n-gram in the documents set may be a number of n-gram having a same number of terms as the candidate n-gram, for instance a number of three word sequences occurring. In some cases, the number of n-grams in the document set is a measure of central tendency of the count for each document, such as a mean, median, or mode. In some cases, the score may be adjusted based on an amount of times the input n-gram occurs in the same document as the candidate n-gram, for instance, by multiplying the score by the count.

In some cases, the scores may be normalized based on an amount of times the candidate n-gram occurs in a larger or different collection of documents, such as a set of documents of the corpus that do not include the input n-gram. The normalizing value may be determined with a similar technique, for instance, as a frequency or count of occurrences of the candidate n-gram in documents not including the input n-gram. Normalizing, in some embodiments, may include dividing one amount by another, such as dividing the frequency with which a candidate n-gram occurs in the documents set including the input n-gram by the frequency with which the same candidate n-gram occurs in a document set that does not include the input n-gram (or was selected without regard to whether the documents contain the candidate n-gram). In some embodiments, normalizing may be proportional, for instance, as a ratio multiplied by some coefficient. In other embodiments, the normalized value may be nonlinear and not proportionate to these two amounts. For instance, some embodiments may suppress the marginal effect at relatively large values of one or both inputs to the normalization process. For example, in some embodiments, the frequency with which the candidate n-gram occurs in the documents including the input n-gram may be a component of both a numerator and a divisor of a ratio, for instance, as a sum with the frequency with which the candidate n-gram occurs in documents that do not include the can input n-gram. The magnitude of the derivative of the normalized value with respect to the amount of occurrences of the candidate n-gram in the document set having the input n-gram may decrease as the amount of occurrences of the candidate n-gram in the document set having the input n-gram increases, e.g., monotonically.

Based on the resulting scores, some embodiments may select expansion terms. Some embodiments may determine which candidate terms have a score above a threshold value and select those corresponding responsive candidate terms as expansion terms. Some embodiments may rank the candidate terms according to their score and select those candidate terms above a threshold rank. In some embodiments, the candidate terms may carry forward their score, and the amount of adjustment to the semantic similarity graphs edge weights may be based on, for instance, proportionate to, the score, with more closely conceptually related terms having a larger effect.

In some embodiments, the expansion n-grams and the input n-gram may collectively form an adjustment n-gram set, and some embodiments may adjust edge weights based on this adjustment n-gram set. To adjust edge weights, some embodiments may adjust feature vectors of the documents. As noted below, in some cases, each document may be expressed as a feature vector, with values of the feature vector corresponding to an amount (e.g., a TF-IDF score, like BM25) of occurrences of a respective n-gram within the respective document. Some embodiments may adjust these values based on a determination that the values correspond to an n-gram in the adjustment n-gram set.

For instance, some embodiments may multiply these values in the feature vectors by a weight in a proportionate adjustment. For example, the n-gram "quick brown fox" may occur with BM25 score of 0.7 in a given document, and the feature vector for that document may have a cardinal value of 0.7 for a vector dimension corresponding to this n-gram. In some embodiments, the user may input the n-gram "jumped over the lazy" along with an instruction to suppress a concept related to this n-gram by 50%. Some embodiments may determine that the n-gram "quick brown fox" is related to the n-gram "jumped over the lazy" with a relatedness score of 0.8, and this may cause the "quick brown fox" to be added to the set of adjustment n-grams. Some embodiments may adjust the value 0.7 downward, for instance multiplying the value 0.7 by a coefficient weight of 0.5, as indicated by the user input of 50%. In another example, the adjustment may be qualified by the amount of similarity (of 0.8), and only 80% of the adjustment may be applied, yielding a coefficient weight of 0.6. As a result, the contribution of the n-gram "the quick brown fox" to similarity between documents in the corpus is expected to be diminished, as the magnitude of feature vectors along this dimension is decreased, and the effect of this dimension on angles between feature vectors is similarly decreased. Similar techniques may be used to increase the effect of expansion terms and the adjustment set more generally.

Figure 6:
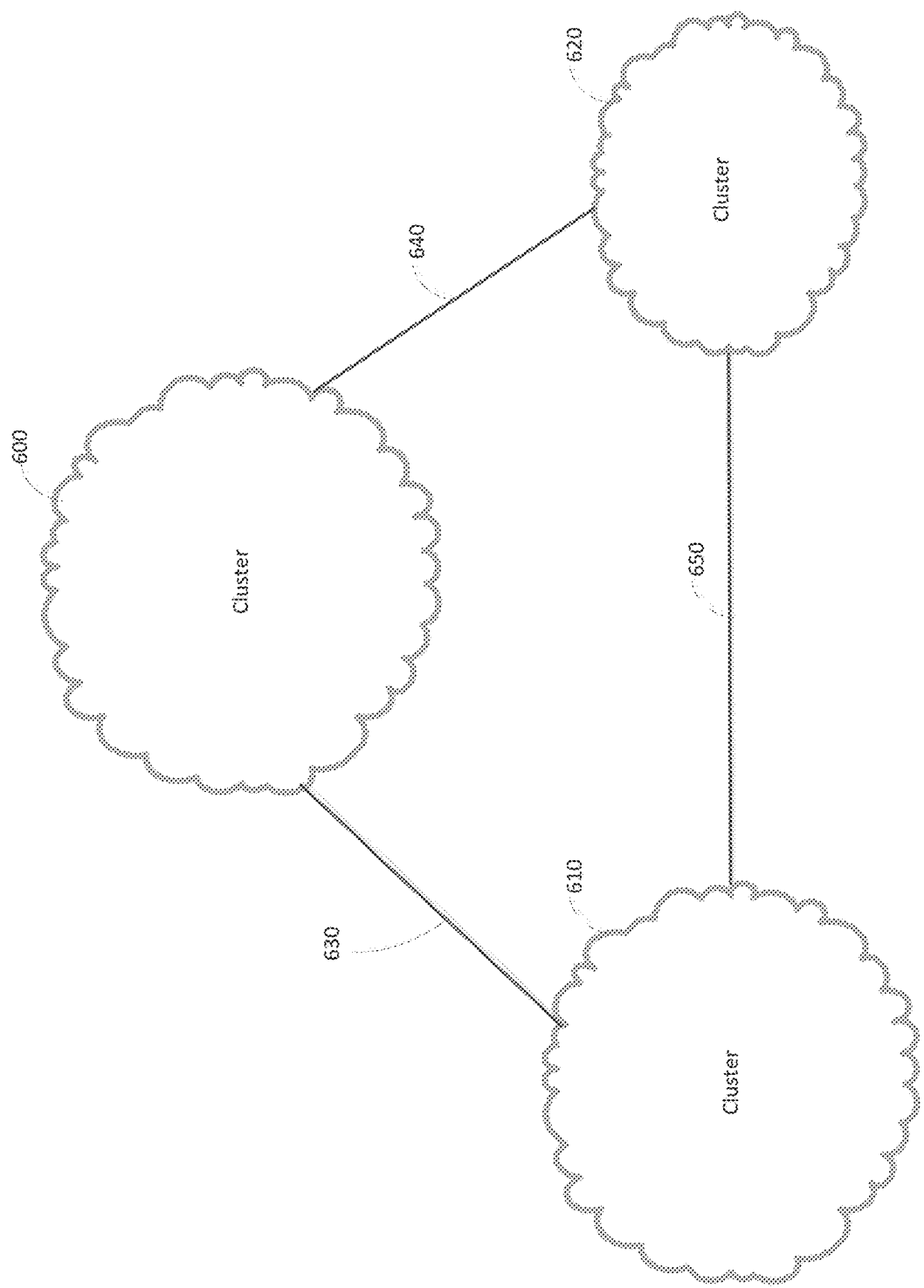
FIG. 6 is a network diagram of clusters of documents linked together in a graphical representation of a semantic similarity graph.

FIG. 6 is a network diagram of clusters of documents linked together in a graphical representation of a semantic similarity graph. Depicted therein are clusters 610, 600, and 620. These may be clusters of documents, sets of documents, chapters, sections, paragraphs, etc. Connecting cluster 610 with cluster 600 is link 630. Link 640 connects clusters 600 and 620 and link 650 connects clusters 620 and 610. FIG. 6 is visual example of the underlying elements described herein and showing only three clusters is an arbitrary number. For example, some corpora may comprise more than 10 clusters, more than 50 clusters, or more than 500 clusters.

Figure 7:
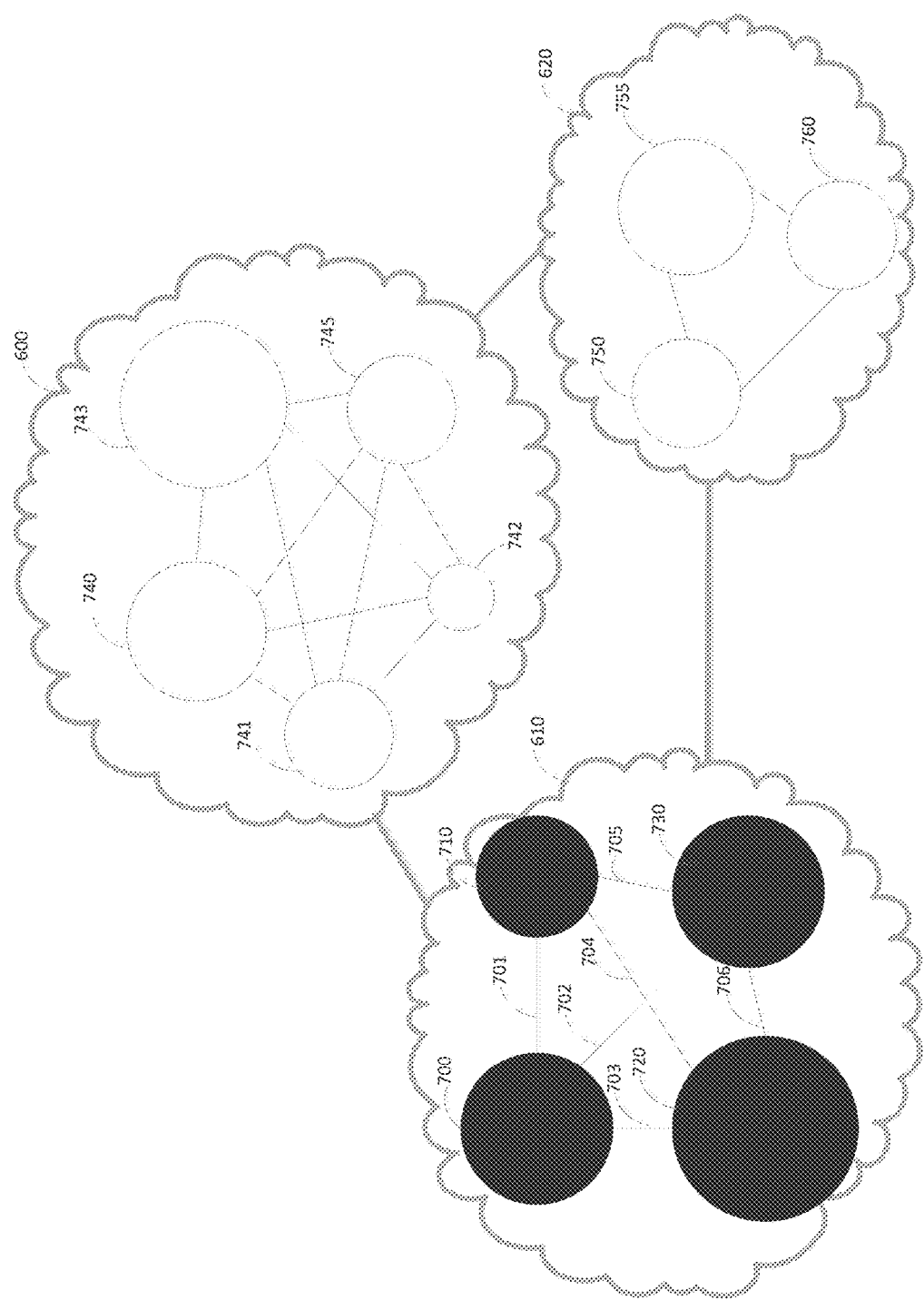
FIG. 7 is a network diagram of documents (the nodes) linked together in a semantic similarity graph.

FIG. 7 is a network diagram of document nodes linked together in a semantic similarity graph. In cluster 1 there may be, for example, four or more documents. In the example of FIG. 7, four documents are shown that contain within each of the corresponding documents a plurality of non-trivial (e.g., meaningful) n-grams including the user-supplied n-gram (e.g., one of the user-input that is either emphasized or deemphasized). In other words, a term supplied by the user for adjusting a semantic similarity graph may find a match in each of a set of four documents. A first set of documents having at least one instance of the user-input term may include documents 700, 710, 720, and 730, as shown in FIG. 7. Documents in a cluster may have links with each of the other documents in a cluster similar to the exemplary links 701, 702, 703, 704, 705, and 706 shown in FIG. 7. Each link may have a length and represent a relationship, e.g., a force in a force-directed graph. The length or visual weight of the link may be based on a cosine of an angle taken between two vectors-documents. When a group of documents, such as the group 700-730 shown in FIG. 7, have a relatively large number of links to each other a cluster such as cluster 610 may be formed.

In the example of FIG. 7, eight documents are shown to contain within each of the corresponding documents a plurality of non-trivial (e.g., meaningful) n-grams as well but without including a match with the user-supplied n-gram. These eight documents are 740, 741, 742, 743, 745, 750, 755, and 760. The size of the circle representing a document may indicate, e.g., the number of n-grams it contains.

In some relevant examples, the corpus of documents is a relatively large collection of unstructured, natural-language text documents. A variety of examples are described below. In some embodiments, the corpus may include more than 1000, more than 2000, more than 5000, or more than 50,000 natural language text documents having a median length of greater than, for example, 500 words. Or embodiments are also consistent with shorter documents, like microblog posts of less than or equal to 140 characters. In some embodiments, the corpus of documents may be documents related in some sense, for example, from the same source or category of sources. In some cases, each document may be associated with metadata, like an author, title, the publication date, a version, and the like, and queries may be supplemented by filtering according to the metadata.

Some of the present techniques are not limited to corpora of unstructured text. Some of the semantic similarity graph manipulation techniques are expected to be useful for interrogating other data sets, or for interrogating structured data associated with unstructured text documents. For instance, various metadata elements of the corpora may serve as the expansion n-grams or the n-grams emphasize or deemphasize. For example, a data set of college basketball statistics may have text bios of players and associated player attributes, like date of birth. One metadata attribute may be date of birth. Some embodiments may present emphasis/de-emphasis and expansion of the date of birth.

In some embodiments, searching the corpus of documents may be expedited by preprocessing the documents. For example, in some embodiments, an index of the documents according to a keyword (e.g., with an n-gram serving as the index keys, which are each paired with a set of document identifiers in which the n-gram is present) may be formed in advance of obtaining the user-supplied n-grams. In some embodiments, the index identifies the number of times each n-gram appearing in the corpus appears in each document. For instance, an index key corresponding to the word "wearable" may have values corresponding to unique document identifiers of every document in which the term "wearable" occurs and the number of occurrences in that document for ranking purposes.

In some embodiments, a multi-n-gram input may be serviced by identifying each index entry in which an n-gram (e.g., of two words, three words, or the like) supplied by the user serves as a key and then combining the responsive documents according to operators between the keywords.

Some embodiments provide to the user a graphical user interface that facilitates insight on clusters of responsive documents (e.g., responsive to an emphasis or de-emphasis of n-grams), rather than merely directing the user to individual documents. In many cases, users are more interested in what an entire field has to say about a particular topic, rather than finding, for instance, the most relevant individual document about some topic. Many traditional search engines are not well-suited for this type of analysis, as it is common for search engines to emphasize individual responsive documents rather than attempt to provide some synthesis of the collection of responsive documents. In contrast, some embodiments consistent with the present techniques may both help the user find the needle in the haystack, as well as develop an understanding of the haystack itself.

To this end, some embodiments may present a semantic similarity graph (e.g., in a force directed graph representation, as described below). In some cases, presenting graphical user interfaces may be performed by sending instructions to a client device that cause the client device to prepare and render a display (e.g., a graphical, haptic, or audible stimulus). In some embodiments, the instructions are conveyed in the hypertext transport layer protocol, for example, as a web pages encoded in hypertext markup language, cascading style sheets, JavaScript™, and various serialized data formats, like JavaScript object notation.

In some embodiments, the n-grams, including the expansion n-grams, to be emphasized/deemphasized terms are topics, entities mentioned, keywords, or metadata attributes of the documents in the corpora (or other data set), and the like. The n-grams pertain not only to a subset of the documents and when selected are used to identify a subset of the documents but also pertain to documents outside of clusters, but the n-gram does not become emphasized/deemphasized merely in virtue of this fact. Rather, it is the combination of the term pertaining to a subset of the documents, and the term being used to identify that subset that makes the n-gram an emphasizing/deemphasizing n-gram.

Emphasizing/deemphasizing n-grams (which may be, e.g., terms, qualitative metadata attributes, and quantitative metadata attributes) may be identified with a variety of techniques. In some embodiments, emphasizing/deemphasizing terms are keywords appearing in the documents. Examples of potentially relevant keywords may be obtained with various techniques, for example, responsive to term frequency inverse document frequency (TF-IDF) exceeding a threshold, with named entity recognition algorithms, topic extraction algorithms, and the like, being executed on the responsive documents. In some embodiments, documents may be preprocessed with these algorithms and associated with results to expedite operations at the time of adjusting the semantic similarity graph.

In some embodiments, expansion n-grams may be selected based on some semantic relationship to the user-supplied n-grams. Examples include n-grams having a high co-occurrence with the user-supplied n-grams (e.g., greater than a threshold amount or frequency). Other examples include n-grams having a high co-occurrence with n-grams co-occurring with the user-supplied n-grams above a threshold. In some embodiments, different criteria may be used to select expansion terms, as user intent often varies between interactions.

Figure 8:
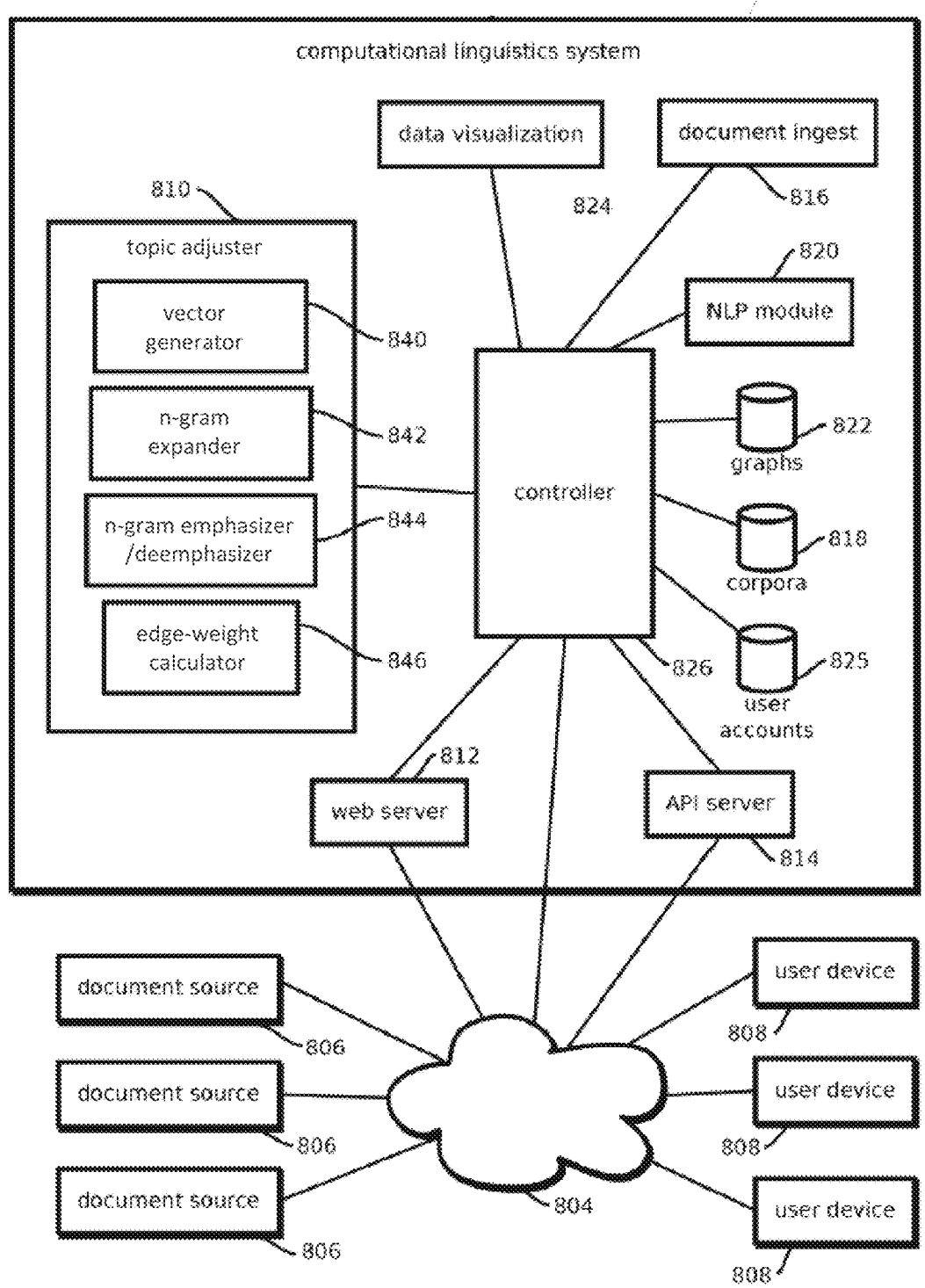
FIG. 8 is a block diagram of the logical architecture of a system configured to perform the processes of FIGS. 1 through 5.

FIG. 8 illustrates, in block diagram form, the logical architecture of an example of a computing environment in which the above-described techniques may be implemented. In some embodiments, the environment includes a computational linguistics system 802, the Internet 804, document sources 806, and a plurality of user devices 808, such as personal computers, laptops, or mobile devices having the features of the below-described computer systems. Representative devices are shown, but it should be understood that substantially more devices and instances may be used in commercial embodiments, e.g., more than 100, or more than 1,000 user devices, and more than 10, or more than 100 document sources.

In this example, subscribing users may interface with the system 802 (which may be geographically remote) via a web browser executing on user devices 808 and exchanges over the Internet 804. In some embodiments, users may interface with the system to view (or otherwise interrogate, e.g., search) trends, entity relationships, sentiment relationships, term relationships, or document relationships (e.g., graphs of such relationships) determined by the computational linguistics system 802 based on unstructured plain text documents.

These documents, in some cases, may be retrieved (e.g., downloaded) from content hosted by third party document sources 806, in some cases as batch downloads in advance of adjustment of the semantic similarity graph.

In some embodiments, the computational linguistics system 802 may include a topic adjuster 810 to perform the above-described techniques, and one or more of a web server 812, an application-program interface (API) server 814, a document-ingest module 816, a corpora repository 818, a natural-language processing module 820, a graph repository 822, a data visualization module 824, a user-account repository 825, and a controller 826. The controller 826 may coordinate the described operations of the other modules. In some cases, prior to granting access, the controller 826 may confirm a user's credentials against a user account in the repository 825 for security purposes and to verify whether a user account is current, e.g., a subscription fee has been paid.

In some embodiments, the topic adjuster 810 includes a vector generator 840, an n-gram expander 842, an n-gram emphasizer/deemphasizer 844, and an edge-weight calculator 846. In some embodiments, the vector generator 840 may perform the steps described above to generate vectors, and the n-gram expander 842 may perform the steps described above to expand user-supplied n-grams. In some embodiments, the n-gram emphasizer/deemphasizer 844 may be operative to emphasize the user-supplied n-grams and the expansion n-grams or operative to deemphasize the user-supplied n-grams and the expansion n-grams. In some embodiments, the edge-weight calculator 846 may be operative to calculate the lengths or weights of links between vectors.

In some embodiments, system 802 may include a web server 812 and (optionally) an application-program interface (API) server 814. These servers may listen to corresponding network ports, maintain session state for various sessions with user devices 808, advance requests and posted data to controller 826, and send responsive data to user devices 808. In some cases, responses may be in the form of web pages, like serialized bodies of markup language, cascading style sheets, and JavaScript™ instructions used by web browsers to render content, like inputs for making requests or data visualizations of the effect of user-supplied, emphasized/deemphasized n-grams. In some embodiments, the API server 814 may be operative to send structured responsive data, like XML or JSON formatted responses to queries and receive machine-generated requests. In some embodiments, the servers may be blocking servers, or the servers may use various techniques to process multiple requests concurrently, e.g., with various asynchronous programming techniques, like by tracking and implementing deferreds or promises.

In some embodiments, the document-ingest module 816 may obtain collections of documents and store those documents in corpora repository 818, which may have analyzed corpora of unstructured plain text documents used to generate the presently described graphs. In some embodiments, the documents may be obtained from different document sources 806, such as remote, third-party repositories of documents, like web servers.

In some embodiments, retrieved and stored corpora are collections of unstructured text documents. In some embodiments, the unstructured text may be included within structured portions of other documents, for example, rendered text within markup instructions in a webpage, or unstructured text embedded in a serialized data format, like paragraphs within an extensible markup language document or JavaScript™ object notation document. This surrounding structure notwithstanding, in some embodiments, at least some, and in some cases most or only, the text analyzed in constructing graph topologies is unstructured text, like human readable plain text in prose form with markup instructions and scripting language instructions removed. For instance, an automated web browser, like Selenium™, may be executed to retrieve web pages, execute scripts to and render markup language construct a document object model of the webpages, and parse visible text from the web pages that is retrievable from ".text" attribute of a DOM object containing the text. Removing the computer-readable portion is expected to cause documents to be grouped according to their content intended to be read by humans, rather than according to the programming library or practices invoked by a developer. Or some embodiments may leave this markup language and scripting instructions in place to analyzed documents according to their mode of construction or to weight terms according to their visual weight when rendered or annotate terms according to their context. In some embodiments, the text may be encoded as Unicode or ASCII text.

In addition to relating (i.e., expanding) n-grams statistically, the present disclosure contemplates the technique of latent semantic analysis (LSA) to correlate semantically related n-grams that are latent in a collection of text. With this technique a computing system may analyze relationships between a set of documents and the n-grams they contain by producing a set of concepts related to the documents and n-grams.

In some cases, an analyzed corpus may be relatively large, for example, containing more than 100 documents, more than 1,000 documents, or more than 10,000 documents, and connections (e.g., edges) indicating semantic similarity between the documents (or entities, sentiments, terms, or the like, as described below) may be relatively numerous, e.g., more than 5 connections on average between documents, more than 50, more than 500, or between each unique pair of documents. In some embodiments, each of the documents may also include a substantial amount of text, for instance, more than 500 n-grams, more than 2000 n-grams, or more than 50,000 n-grams In some embodiments, an analyzed corpus used to construct a graph may be relatively large. For expected use cases of the present inventions, the corpus is larger than would be economically feasible for humans to manually perform (e.g., the processes described with respect to FIGS. 1 and 2) in reasonable amounts of time, and thus computers are required to implement them (i.e., the processes described with respect to FIGS. 1 and 2) in intended applications having commercial relevance. For example, the corpus may include more than 50 documents, more than 500, or more than 5,000 documents. Further, in some embodiments, the documents within the corpus may be relatively long, for example, having a median length of more than 50 words, more than 500, or more than 5,000 words, depending upon the use case.

The necessity of computer implementation, even for relatively small corpora, can arise from the number of documents, the length of documents, or the semantic pairwise interrelationships between the documents, which can give rise to data structures that can grow factorially with each additional document, depending upon how aggressively semantic links between documents are pruned. Due to this scaling effect, each additional document in some applications can impose substantial additional computational and memory burdens, and increasing the number of documents even by a small amount can be a non-trivial problem, particularly without the benefit of some of the techniques described herein to expedite computer processing of the analysis and conserve limited memory within a computer system.

In some embodiments, the documents within the corpus may be related in some fashion, for example, all from the same source or related to a category of topics, entities, sentiments, or the like. Examples of corpora include academic literature, such as scientific literature, medical literature, economic literature, psychological-research literature, and the like, for instance, from a given journal, university, country, etc. Other examples include webpages, for example, from businesses, like the 500 highest ranking business entity websites responsive to a given query, businesses within a given region, business in a given industry, businesses at a given state of development (like emerging businesses), or combinations thereof, like startups in Silicon Valley targeting the shipping industry to give one example. Other examples of corpora include documents hosted in government databases, such as the full text patent database hosted by the United States Patent Office, regulatory filings with the Securities and Exchange Commission hosted in the Edgar database, court filings within the Pacer database, Federal Communication Commission filings, United States Food and Drug Administration petitions, and the like. Another example of corpora includes various bodies of journalism, like catalogs of newspapers, magazines, and other news sources. Relevant corpora also include social media posts, for example, microblog posts, blog posts, posts within social networks, and the like, as well as résumés, job postings, and product manuals. Some embodiments may operate on corpora of unrelated documents, such as any corpus containing metadata that could be represented as discrete data points or ranges.

In some cases, the corpus is obtained by processing non-text documents, for example, by performing optical character recognition on image-formatted documents or by submitting photographs to image recognition and description algorithms that return a prose description of photographs. In some cases, the corpus may be obtained without metadata indicating the semantic relationships between documents within the corpus, and these relationships may be discerned, for example, with software provided by Quid of San Francisco, Calif., or by performing latent semantic analysis (LSA) or other distributional semantic techniques to construct the graphs described herein. In some cases, the analysis may be performed by an unsupervised machine learning technique, or some embodiments may train supervised machine learning models (e.g., with stochastic gradient descent) based on a training set, such as text data having manually-labeled features. Unsupervised methods are expected to be less expensive and more broadly applicable, as the cost and complexity of feature engineering may be reduced relative to supervised techniques, which is not to suggest that at least some embodiments are not also consistent with supervised learning.

In some embodiments, natural-language processing module 820 may analyze these corpora and store resulting graphs in graph repository 822. In some cases, graphs like those described above may be obtained by subjecting a corpus to various types of distributional semantic analysis, e.g., statistical similarities measures like latent semantic analysis (LSA), random indexing, normalized Google™ distance, best path length on a semantic self-organizing map, vector generation of an explicitly-defined multidimensional semantic space, or other techniques by which the distribution of terms in documents is represented as relatively high-dimensional vectors, and semantic similarity is measured by according to similarity of the vectors, for instance, cosine (cos) similarity or Minkowski distance. If the cosine of the angle between two vectors is below a threshold, the two vectors (documents) are deemed similar otherwise the edges are pruned away from the graph. In implementations where the n-grams of a document are disregarded in their relations between each other (e.g., context, grammar, other word order, etc.), a bag-of-words model is invoked. The analysis technique used by some embodiments may be selected based on the type of relationships to be measured, e.g., between entities or terms, versus between larger units of language, like documents or paragraphs. In some cases, a corpus may be analyzed multiple ways, yielding graphs of relationships between entities mentioned in the documents as well as graphs of relationships between the documents.

Graphs need not be labeled as a "graph" in program code to constitute a graph. Other constructs may be used to the same ends and still constitute a graph. It is enough that the arrangement of information (e.g., in program state, storage, or both) contain the attributes of the presently described graphs to constitute a graph having edges and nodes. For example, in an object-oriented programming environment, documents may be mapped to "document" objects, and those objects may have an attribute of a list of semantically similar documents each of which corresponds to a different "document" object and has a similar list referencing other documents, regardless of whether this arrangement is referred to as a "graph" in code.

In some embodiments, to measure relationships between documents (or other smaller language units, like paragraphs, phrases, and terms), each document may be represented by a feature vector characterized by values indicating the presence, number of occurrences, or frequency of each non-trivial (meaningful) n-gram in the document. N-grams are sequences of one or more words, e.g., "quick" is an example of an n-gram where n=1, "quick brown" is another n-gram where n=2, and "the quick brown fox jumped" is another where n=5. In some cases, relatively uninformative or trivial terms, referred to generically as stop-words (e.g., "the," "a," and "an"), or low scoring (or high scoring, depending on the implementation) terms detected by term frequency inverse document frequency (TF-IDF) statistical analysis may be omitted. In other words, if the n-gram is found in a large majority of documents it may be deemed a stop-word and not considered in the vector. A TF-IDF analysis may be performed on every n-gram in the document.

To calculate TF-IDF for a given term (e.g., an n-gram), some embodiments may count the number of times the given term (n-gram) occurs within a given document and the number of other terms in the document before calculating a frequency with which the term occurs within the document. Some embodiments may also count the number of times an n-gram occurs in a larger collection of documents, such as the analyzed corpus of a sampling thereof, as well as the total number of n-grams in the larger collection of documents to calculate another frequency with which the term appears in the larger collection of documents. The two resulting frequencies may be compared, for instance, dividing (or multiplying) one frequency by the other, to determine the TF-IDF score.

In some embodiments, the term frequency may be a number of times that a term occurs in a document. In other embodiments, the term frequency may be a Boolean frequency, where the value is a 1 if the term occurs and 0 otherwise. In other embodiments, the term frequency may be calculated and scaled logarithmically. In still other embodiments, the term frequency may be an augmented frequency, which prevents a bias towards longer documents that simply have more words but not necessarily indicating a greater relevancy in determining edge weights. The inverse document frequency may provide a measure of how much information a term provides, indicating whether the term is common or rare across all documents in a corpus. The combination determines the statistical TF-IDF score (e.g., a ranking, weight, importance, significance, etc.), where a high score for a corpus is reached by a relatively high term frequency (i.e., TF in the given document) and a relatively low document frequency (IDF) of the term in the corpus. Typically, the score (weight) in a TF-IDF calculation is made by multiplying the TF by the log of the number of documents N in a corpus divided by the document frequency DF (i.e., TF*log (N/DF).

In some embodiments, instead of or as a complement to calculating the typical TF-IDF, the present disclosure contemplates calculating scores using the Okapi Best Match (BM) 25 function or its variants (e.g., BM11, BM15, BM25F, and BM25+), as is known in the art. BM25 may be used as a form of ranking documents according to their matching term(s) provided by a user giving its relevance in a corpus. In some implementations, BM25 may be based on a probabilistic retrieval framework that takes into account a term's IDF score, a term's frequency, an average length of documents in a corpus, and one or more other variables or constants.

Position of a value in the feature vector may correspond to one n-gram, e.g., the first position of a vector may correspond to the n-gram "jumped over," and documents containing this n-gram have a feature vector with a value in the first position indicating that this n-gram is present. Documents may be analyzed as a whole or at a higher resolution. For instance, in some embodiments, each document may be partitioned into paragraphs, and then, a feature vector may be constructed for each paragraph, with values of the vector corresponding to the presence of n-grams within the respective paragraph. Vectors need not be labeled as "vectors" in program code to constitute vectors, e.g., ordered lists may constitute a vector in some cases.

Since the universe of n-grams a corpus could contain is relatively large and since documents tend to use a relatively small portion of these n-grams, feature vectors tend to be relatively highly dimensional and sparse, having a value of zero for most n-grams. To mitigate the burden of high-dimensionality, in some cases, feature vectors may be subjected by some embodiments to various types of dimensional reduction, such as indexing, random indexing, or singular value decomposition (SVD).

In some cases, a corpus or cluster of documents may be represented by arranging the feature vectors into a term-document matrix, plane, or chart. For instance, each row or column may correspond to a document, and each row or column may correspond to the n-grams with the intersecting values creating as a whole the feature vector of that document. Thus, rows may represent documents and columns may represent n-gams or vice versa in the representation of the feature vectors.

Or in some embodiments, a document, a cluster of documents, or a corpus may be represented as a co-occurrence matrix, where both rows and columns represent n-grams, and values indicate the presence, number, or frequency of instances in which corresponding n-grams occur within a threshold distance of one another in the text. In some embodiments, co-occurrence matrices for documents may be appended to one another to represent a corpus in a higher-dimensional matrix, e.g., in a three dimensional corpus matrix, with each two-dimensional co-occurrence matrix corresponding to a document. Such matrices may be reduced in dimension with a number of techniques, including random indexing. Matrices need not be labeled as a "matrix" in program code to constitute a matrix, e.g., an ordered list of ordered lists may constitute a matrix.

In some cases, a variety of types of relationships may be processed with some embodiments. For instance, semantic similarity or relatedness of entities, sentiments, or terminology mentioned in documents may be determined with computational natural language processing of unstructured plain text corpora. In some embodiments, a corresponding graph may be constructed, with documents, paragraphs, entities, sentiments, or terms as nodes, and weighted edges indicating relationships, like similarity, relatedness, species-genus relationships, synonym relationships, possession relationships, relationships in which one node acts on another node, relationships in which one node is an attribute of another, and the like. In some cases, the edges may be weighted and directed, e.g., where the relationship applies in one direction and can vary in magnitude or certainty.

Analyses of such matrices may entail operations like insertion, multiplication, and addition. As noted above, in some embodiments, matrix operations may be prohibitively slow or memory intensive for larger datasets. A number of techniques may be used to improve efficiency, such as expediting these operations (e.g., reducing processor instruction cycles), reducing memory consumption, reducing area consumption (e.g., in hardware implementations), and reducing power consumption. In some embodiments, to expedite operations, matrix operations may be performed in a single instance of a computer system, for example, within a single memory address space of a single operating system, and in some cases, by holding some or all of the matrix data in program state concurrently to avoid disk access or network access latency penalties. Or, some embodiments may distribute operations on additional computing systems, which is not to imply that any other feature described herein may not also be omitted. In some embodiments, the computer system may be configured with a relatively large amount of random access memory and on-chip cache memory to these ends.

In some cases, some of the sparse-matrices described above may consume a relatively large amount of memory using some traditional techniques. To conserve memory, some embodiments may compress the sparse matrices, for example, by decomposing a matrix into vectors and translating the vectors into an index indicating which vector scalars have a nonzero value and corresponding indications of those values. Some embodiments may compress such vectors with run-length coding of values of those values that are zero. Some examples may compress sparse matrices as a dictionary of keys, a list of lists, a coordinate list, a compressed sparse row, or a compressed sparse column. In some cases, such matrices, or portions of sparse matrices, may be expanded for some vector operations and then re-compressed after and before, respectively, the sparse matrices, or portions thereof, are moved upward in a memory hierarchy towards a processor.

Various encodings may be selected to improve the functioning of a computer system. In some cases, values of matrices, like weights, may be normalized, for example, ranging between zero and one or as 8, 16, or 32 bit binary values having a number of digits selected in view of an operating system, register size, memory bus size, and other hardware constraints of a computer system upon which the above processes are to be run to perform more efficiently (e.g., to expedite operations and conserve memory).

Some embodiments may determine document similarity based on latent semantic analysis (LSA) of unstructured text in the documents. For instance, some embodiments may create a term-document matrix of the documents. Then, the term-document matrix may be transformed with singular value decomposition (SVD) to map documents to concepts expressed by the terms. Documents having similar concepts may be deemed similar, e.g., based on similarity of concept vectors for the documents yielded by SVD. In some cases, terms appearing in the documents more frequently than a predetermined threshold may be determined and weighted according to TF-IDF. In some cases, the resulting weighted term-document matrix may be decomposed by determining two vectors, that when multiplied, approximate the matrix. In some embodiments, error between the approximation and the matrix may be determined, and the error may be decomposed by determining two more vectors that when multiplied approximate the matrix of errors. This process may be repeated until an aggregate error is determined to be smaller than a threshold. A threshold number (e.g., the second and third) of the resulting vectors may correspond to dimensions in a concept space, where the concepts that emerge correspond to co-occurrence of terms in documents indicated by clusters in the space. Documents may be clustered according to their corresponding vectors in the concept space, or similarity of documents may be determined by some embodiments by comparing their respective vectors in this space, e.g., based on cosine similarity or other measures.

In some cases, high dimensional sparse vectors may be reduced in dimension with random indexing. For instance, document text may be represented in a co-occurrence matrix, where rows represent n-grams, columns represent adjacent n-grams (e.g., within a threshold number of words in the text), or vice versa, and values represent presence, number, or frequency of instances in which the corresponding terms are determined to be adjacent to one another in the text. In some cases, to reduce memory consumption of sparse vectors in such a semantic similarity analysis, a co-occurrence matrix may be created by representing adjacent n-grams as vectors that are smaller (e.g., substantially smaller) than the number of potential adjacent n-grams and are made generally distinguishable from one another by randomly (e.g., pseudo-randomly) assigning values, like 0, +1, or −1. As adjacent n-grams are encountered during parsing, corresponding rows or columns of n-grams in the co-occurrence matrix may be updated by summing current values of the row or column with corresponding values of the adjacent n-gram vector. Similarity of n-grams (and corresponding entities) may be determined based on similarity of resulting vectors in the co-occurrence matrix, e.g., based on cosine similarity.

In some cases, similarity (or other relationships) between larger language units may be determined. For instance, in some cases, a feature vector may be determined for each document in a corpus. Some embodiments may execute a density-based clustering algorithm, like DBSCAN, to establish groups corresponding to the resulting clusters and exclude outliers. To cluster according to vectors (e.g., a document node), some embodiments may iterate through each of the vectors reflected in the records and designate a vector as a core location in vector space if at least a threshold number of the other vectors in the records are within a threshold distance in vector space (e.g., where similarity determines distances between vector nodes). Some embodiments may then iterate through each of the vectors and create a graph of reachable vectors, where aggregated nodes (e.g., a cluster) on the graph are identified in response to non-core corresponding vectors being within a threshold distance of a core vector in the graph, and in response to the core vector in the graph being reachable by other core vectors in the graph, where two vectors are reachable from one another if there is a path from one vector to the other vector where every link and the path is a core vector and it is within a threshold distance of one another. The set of nodes in each resulting graph, in some embodiments, may be designated as a cluster, and points excluded from the graphs may be designated as outliers that do not correspond to clusters.

In some cases, when performing these operations, movements within a memory hierarchy of a computer system (e.g., from persistent storage, to dynamic random access memory, to L3 cache, to L2 cache, to processor registers) may be relatively slow, and memory space may be particularly limited higher in the hierarchy, closer to the processor. For example, access to data stored in registers of a processor, such as a CPU or graphics processing unit, may be relatively fast, while the amount of available storage may be relatively low. Level 2 and level 3 cache, respectively, may offer trade-offs of increasing magnitude, exchanging slower access times for greater storage space. Similarly, dynamic random access memory may offer even greater storage, though access times may be several orders of magnitude slower than the registers or cache memory, and persistent system storage, such as a hard disk or solid-state drive, may extend this trade-off even further. In some embodiments, matrices may be large enough that during operation substantial portions of the matrix, for example, most of the matrix, cannot fit into the higher levels of a memory hierarchy. Portions of the matrix may be swapped in and out of the higher levels of memory hierarchy during operations on those portions. As a result, in some embodiments, movement of data between levels of the memory hierarchy may account for a substantial portion of the computing resources, e.g., time and memory, consumed by a matrix operation. As some use cases reach relatively large scales, this consumption of computing resources may become prohibitive.

In some embodiments a blocking algorithm may be executed during certain matrix operations, for example, when multiplying two dense matrices or a dense matrix by a sparse matrix, to improve the functioning of the computer system and reduce the amount of time spent shifting data back and forth between levels of a memory hierarchy. In some embodiments, upon initiating a matrix multiplication, one or both of the matrices may be subdivided into blocks (e.g., tiles), each having a plurality of contiguous values within the respective matrix within a plurality of a sequence of rows and columns, for instance, those values that are both in the first 8 columns and in the first 8 rows might constitute one tile. In some embodiments, tile size may be selected based on the amount of available memory at various levels of a memory hierarchy, such that a given tile can fit within a targeted level of the hierarchy, like the level 2 or level 3 cache. Next, some embodiments may iterate through the tiles, loading the tiles into a higher level of the memory hierarchy, and then performing operations with that tile. In some embodiments, a given tile, after being loaded into the higher level the memory hierarchy, may be applied to update each implicated value of a product matrix. In some cases, the values of the product matrix may be initially set to zero, and then those values may accumulate updates as tiles are loaded and processed, until all of the tiles have been processed, and the final value of the resultant matrix is known. In some cases, updating a given value may include summing an existing value with one or more products of values within a tile that has been loaded into the higher level of the memory hierarchy. References to higher and lower levels of memory hierarchy, rather than specific levels, are intended to indicate the applicability of this approach to different levels of the hierarchy. For example, the higher level and the lower level may be level 2 cache and dynamic random access memory, respectively, or level 2 cache and level 3 cache, respectively. In some cases, multiple levels of tiling may be performed, e.g., a tile loaded into cache may be subdivided into register-sized sub-tiles. In some cases, some of the techniques for accelerating matrix or vector operations or conserving memory may be implemented by invoking appropriate sequences of commands in a basic linear algebra subroutine library, like level 1, 2, or 3 commands.

In some embodiments, data visualization module 824 may be operative to prepare data visualizations for display on user devices, e.g., visualizations of the graphs described herein. In some cases, such visualizations may include physics-based arrangements of nodes within a display, like a force-directed layout. In some cases, graph generation and visualization preparation takes place on system 802, and resulting interactive visualizations run (e.g., entirely) in a web browser of a user device. In some cases, this entails displaying and manipulating thousands of vectors and edges in an environment on user devices (e.g., a mobile device) not known for speed. At the same time, in some use cases, users desire a relatively large amount of data on display, while keeping a responsive frame rate. To increase frame rate, some embodiments may use various techniques to optimize the network visualization and make the computer system run faster, including invoking WebGL commands to enlist a user's GPU in rendering a web page and pre-processing.

Graphs of real-world information are often relatively intricate. In some embodiments, visualizations may support real-time (e.g., in this context, with less than 500 ms latency) interactions with relatively large numbers of interactive objects, e.g., more than 500, like more than 1,000, and in some cases as many as 20,000 interactive objects with near zero latency. In some embodiments, this speed is accomplished by pre-processing physics models of graph layouts with graphical processing units (GPUs) of system 802, to reduce the computational burden on less powerful CPUs executing browsers on user devices. In some cases, displays may be relatively high dimensional, e.g., various visual attributes like line weight, icon size, color, transparency, drop shadow offsets, or properties of physical models, like inertia, friction, attractive forces, repulsive forces, momentum, frequency of oscillation, and the like, may be mapped to different dimensions like those discussed above, e.g., similarity, relatedness, sentiment, and the like. Connections tend to be more relatively complicated and irregular, and embodiments often do not determine the visual shape of the graph ahead of time. Indeed, graph isomorphism provides for a relatively large number of visual arrangements of otherwise identical graphs, but many arrangements are relatively un-informative and difficult to visually parse to a human user consuming the resultant data.

FIG. 7 provides assistance in the visualization of graph relations. Some embodiments of module 824 may arrange vectors (i.e., vertices, but also referred to as nodes) and edges using a physics simulation that mimics the stretching of spider webs, as shown in FIG. 7. Some spider-web-inspired representations may model interactions between each pair of vectors as a Coulomb-like repulsion and an additional Hooke-like attraction in the presence of an edge between the pair. A relatively weak gravitation-like force may be modeled to prevent separate components and isolated vectors from venturing too far from the network's center of mass. Thus, some embodiments may use this physics-based network layout. In some cases, the parameters and initial conditions of the physics based model may be determined by module 824, and instructions for executing the model and adjusting the model based on user input may be sent to the user device, e.g., in the form of JavaScript™ instructions that model, for instance, a user selecting and dragging a node as a force applied to the physics model. Embodiments are expected to appear relatively natural, and the hierarchy of a network's structure is expected to be readily apparent; both small and large network structures are exposed, which is expected to allow users to study relationships between groups of vectors on different scales.

Running a physics simulation in a user's browser can easily exceed the available computing resources, as the simulation can be inherently resource-intensive for larger, highly connected data sets. To mitigate this issue, some embodiments may exploit phenomena expected to arise as the size of the data scales. It is expected that, in some embodiments, the number of time steps consumed to achieve equilibrium starting with a random configuration of vectors scales linearly with the number of vectors. That is undesirable for presentation purposes (though some embodiments are consistent with this approach, particularly for smaller data sets). To mitigate this, some embodiments may arrange for initial conditions of the simulation so the equilibrium is attained faster.

To select initial conditions of the physics-based animation of this n-body system, some embodiments may perform a gradient descent optimization. Some embodiments may compute the gradient of the modeled system's energy (e.g., based on the forces affecting nodes), integrate that to compute momentum, and move the particles in the simulation representing nodes accordingly. Initial conditions of the gradient descent may be selected strategically in some cases to mitigate the effects of local minima in what is expected to be a relatively rough energy landscape (though embodiments are also consistent with random selection of initial conditions, like with a stochastic gradient descent). For instance, some embodiments may seed the simulation with a vector configuration that is in the vicinity of the final destination. To this end, some embodiments may execute a discretized version of the problem and search through all vector configurations on a 2D grid.

This process is still of combinatorial complexity, however, and may be generally too expensive for some larger graphs. To mitigate this issue further some embodiments may simplify the search space to one dimension with space filling curves, like a z-curve or Hilbert curve that cover a 2D region of space with a one-dimensional curve. Such space-filling curves may be constructed via an iterative process, whereby at each step of the iteration the curve is refined at ever-finer scales. By ceasing iterations at a finite step, some embodiments may obtain a curve with just enough points to accommodate the data at issue. Further benefits, in some embodiments may arise from the property of some space filling curves: the 2D distance between any pair of vectors is well-approximated by (the square root of) the distance along the curve. In this scenario, in some embodiments, the problem of finding an approximate 2D layout is equivalent to finding an energy-optimal linear ordering of vectors, which some embodiments may use to implement less computationally intensive heuristics, circumventing the initial combinatorial complexity. That said, not all embodiments provide this benefit, as the various inventions described herein are independently useful.

In some embodiments, vector generator module 840 may be operative to implement operations 130 and 230 of FIGS. 1 and 2, respectively. For instance, this module may structurally generate a list of meaningful n-grams (e.g., n-grams having a score above a threshold) for each document in a corpus.

In some embodiments, n-gram expander module 842 may be operative to implement operations 150 and 250 of FIGS. 1 and 2, respectively. More specifically, this module may structurally implement operations 300, 310, 320, 330, 340, 350, 360, and 370, which are depicted in FIG. 3.

In some embodiments, n-gram emphasizer/deemphasizer module 844 may be operative after operations 180 and 280 are determined, as shown in FIGS. 1 and 2, respectively. The emphasizer/deemphasizer module 844 may operate as an emphasizer and perform most if not all of the operations depicted in FIG. 4. The emphasizer/deemphasizer module 844 may also operate as a deemphasizer and perform most if not all of the operations depicted in FIG. 5. For example, operations 400, 410, 500, and 510 need only be performed once and may in some embodiments be performed by vector generator module 840.

In some embodiments, edge-weight calculator module 846 may be operative to implement operations 193 and 293 of FIGS. 1 and 2, respectively.

Figure 9:
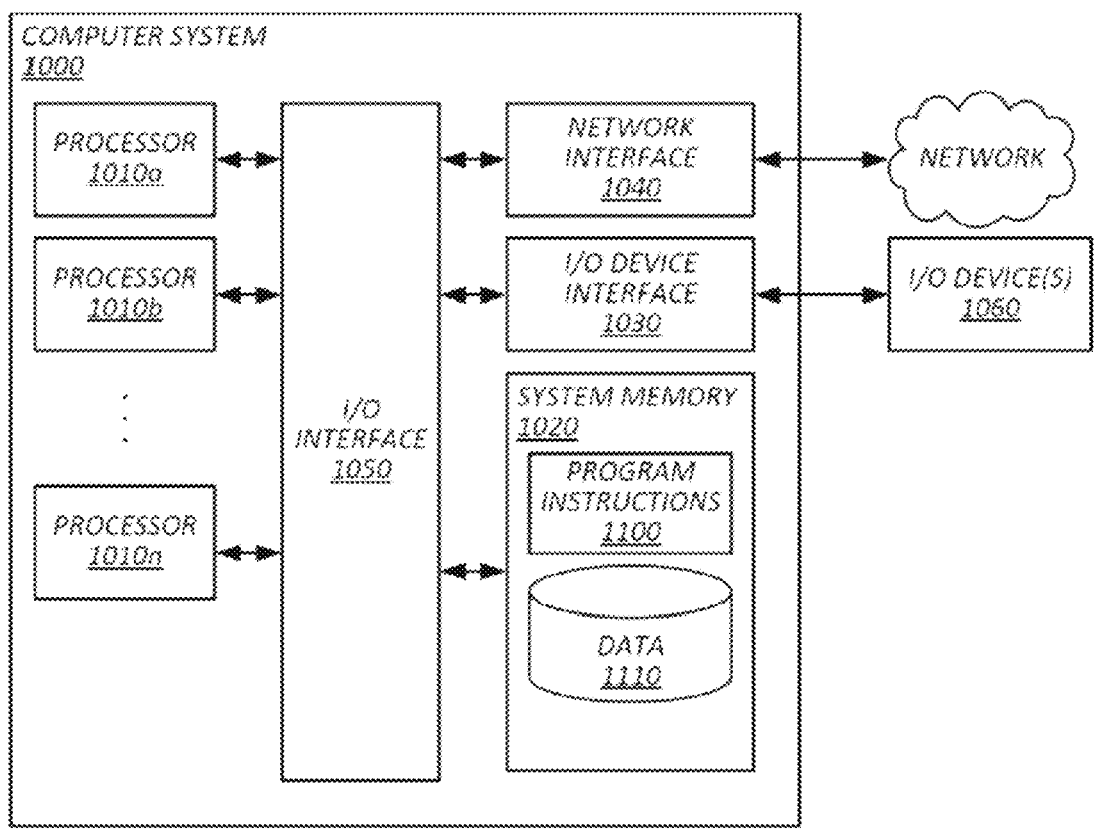
FIG. 9 is a block diagram of an example of a computer system by which the techniques disclosed herein may be implemented.

FIG. 9 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors $1010a$-$1010n$) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose processors. A processor may receive instructions and data from a memory (e.g., system memory 1020). Computing system 1000 may be a uni-processor system including one processor (e.g., processor $1010a$) or a multi-processor system including any number of suitable processors (e.g., $1010a$-$1010n$). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on a remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors $1010a$-$1010n$) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, and machine-readable medium. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes (e.g., in a flow chart) may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps (or processes of a method) should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The present techniques will be better understood with reference to the following enumerated embodiments:

1. A method of modifying semantic similarity graphs representative of pair-wise similarity between documents in a corpus, the method comprising: obtaining, with one or more processors, a semantic similarity graph that comprises more than 500 nodes and more than 1000 weighted edges, each node representing a document of a corpus, and each edge weight indicating an amount of similarity between a pair of documents corresponding to the respective nodes connected by the respective edge; after obtaining the semantic similarity graph, obtaining, with one or more processors, an n-gram indicating that edge weights affected by the n-gram are to be increased or decreased; expanding, with one or more processors, the n-gram to produce a set of expansion n-grams, wherein expanding the n-gram comprises: determining which documents in at least part of the corpus contain the n-gram to form a first set of documents; determining which documents in at least part of the corpus do not contain the n-gram to form a second set of documents, the first set of documents and the second set of documents each including more than 20 documents; selecting a set of candidate n-grams from the first set of documents, the set of candidate n-grams having more than five n-grams; determining an amount of times each candidate n-gram occurs in the first set of documents to form a first amount; determining an amount of times each candidate n-gram occurs in the second set of documents to form a second amount; determining, for each of the candidate n-grams, a candidate n-gram score based on the first amount and the second amount, wherein the candidate n-gram scores tends to increase or decrease as a ratio of the first amount to the second amount increases or decreases; and selecting expansion n-grams based on the candidate n-gram scores, the expansion n-grams and n-gram collectively forming an adjustment n-gram set; adjusting, with one or more processors, edge weights of the semantic similarity graph of edges between pairs of documents in which members of the adjustment n-gram set co-occur in response to determining that the respective documents contain a member of the adjustment n-gram set; and storing the adjusted weights in memory.

2. The method of embodiment 1, wherein selecting expansion n-grams based on the candidate n-gram scores comprises: ranking the candidate n-grams by the candidate n-gram scores; and selecting candidate n-grams in response to determining that the selected candidate n-grams satisfy a threshold ranking.

3. The method of any of embodiments 1-2, wherein determining an amount of times each candidate n-gram occurs in the first set of documents to form a first amount is performed before selecting a set of candidate n-grams from the first set of documents.

4. The method of any of embodiments 1-2, wherein determining, for each of the candidate n-grams, a candidate n-gram score based on the first amount and the second amount comprises: determining a candidate n-gram score proportionate to the ratio of the first amount to the second amount.

5. The method of any of embodiments 1-4, wherein determining, for each of the candidate n-grams, a candidate n-gram score based on the first amount and the second amount comprises: determining a candidate n-gram score disproportionate to the ratio of the first amount to the second amount, wherein the candidate n-gram score monotonically changes in relation to the ratio of the first amount to the second amount.

6. The method of any of embodiments 1-5, wherein determining, for each of the candidate n-grams, a candidate n-gram score based on the first amount and the second amount comprises: determining a ratio of a first value to a second value, the first value and the second value both being based on the first amount.

7. The method of any of embodiments 1-6, wherein the first amount is based on both a count of a number of times the corresponding candidate n-gram appears in the first set of documents and a count of a number of n-grams in the first set of documents.

8. The method of embodiment 7, wherein the count of a number of n-grams in the first set of documents is a count of a number of n-grams of the same number of terms as and corresponding candidate n-gram.

9. The method of any of embodiments 1-8, wherein the second amount is a frequency based on a measure of central tendency of a number of n-grams in each of the second set of documents.

10. The method of any of embodiments 1-9, wherein determining the candidate n-gram score based on the first amount and the second amount comprises performing steps for determining the candidate n-gram score.

11. The method of any of embodiments 1-10, wherein adjusting edge weights comprises: obtaining a feature vector representation of each document, each feature vector indicating an amount of occurrences of respective n-grams in the respective document with respective cardinal values; and for each of at least some of the feature vectors, selecting cardinal values of the respective feature vector correspond to n-grams in the adjustment n-gram set and adjusting the selected cardinal values.

12. The method of embodiment 11, wherein adjusting the selected numerical cardinal values comprises steps for adjusting the selected cardinal values.

13. The method of embodiment 11, wherein adjusting edge weights comprises: determining document pair-wise similarity based on angles between adjusted feature vectors.

14. The method of embodiment 11, wherein adjusting edge weights comprises: steps for determining similarity of feature vectors.

15. The method of any of embodiments 1-14, wherein the obtained graph is a semantic similarity graph comprising vectors as nodes and edges with weights, the vectors being generated by: generating, for each document of the corpus, a list of all the unique document n-grams occurring in the document; counting, for each document of the corpus, the number of times each unique document n-gram occurs in the document and the number of times each unique document n-gram occurs in each of the other documents of the corpus to form a third count and a fourth count, respectively; calculating, for each document n-gram, a document n-gram relation score; removing from each list of each document of the corpus a portion of the lowest ranking document n-grams based on their respective document n-gram relation score; and determining, for each document of the corpus, a vector based on the document n-gram relation score of each n-gram of the respective list, wherein the weighted similarity comprises a similarity value that is based on angles between the vectors of two nodes and that is above a threshold.

16. The method of any of embodiments 1-15, comprising: preparing instructions to form a graphical representation of a semantic similarity graph having the adjusted weights, the graphical representation being a force directed graph, wherein preparing the graphical representation comprises: clustering the semantic similarity graph having the adjusted weights; and extracting cluster topics from text of documents corresponding to at least some resulting clusters.

17. The method of any of embodiments 1-16, wherein expanding on the n-grams to produce the one or more expansion n-grams comprises comparing a conditional probability of observing a matching n-gram given a user-input n-gram with a probability to observe an arbitrary number of times the matching n-gram in the respective document, the probability to observe the arbitrary number of times the matching n-gram being based on a hypergeometric distribution or a Poisson distribution.

18. The method of any of embodiments 1-17, wherein the n-gram is obtained based on a cluster of the semantic similarity graph selected by a user.

19. The method of any of embodiments 1-18, wherein the n-gram is an expansion n-gram of another n-gram input by a user.

20. The method of any of embodiments 1-19, further comprising: determining expansion n-grams of a plurality of n-grams to form a plurality of adjustment n-gram sets; and detecting and removing duplicate expansion n-grams of the plurality of adjustment n-gram sets.

21. The method of embodiment 1, wherein: the semantic similarity graph that comprises more than 10,000 nodes and more than 20,000 edges; the semantic similarity graph is encoded as a square symmetric matrix having rows and columns corresponding to an ordered list of the documents and values corresponding to edge weights; the documents have an average number of words greater than 200; and determining adjusted weights or obtaining the semantic similarity graph comprise steps for reduce an amount of time spent shifting data back and forth between levels of a memory hierarchy.

22. The method of any of embodiments 1-21, where adjusting comprises:
influencing the semantic similarity graph based on user-supplied n-grams that indicate aspects of the semantic similarity graph that the user wishes to modify.

23. A system, comprising: one or more processors and memory storing instructions that when executed effectuate the operations of any of embodiments 1-22.

24. A tangible, non-transitory, machine-readable media storing instructions that when executed effectuate the operations comprising the operations of any of embodiments 1-22.

What is claimed is:

1. A tangible, non-transitory, machine-readable medium storing instructions that when executed by one or more processors effectuate operations comprising:
gauging, with one or more processors, document pair-wise semantic similarity of documents;
sending, with one or more processors, instructions to a client computing device web browser to display a visual representation that indicates the pair-wise semantic similarity of the documents;
receiving, with one or more processors, from the client computing device web browser, an input n-gram in association with a command to increase or decrease semantic similarity between documents that include the n-gram;

obtaining, with one or more processors, access to a corpus including natural language text documents;

determining, with one or more processors, an expansion n-gram by determining that the expansion n-gram is related to the input n-gram based on statistical analysis of co-occurrence of candidate n-grams with the input n-gram in the natural language text of the corpus, wherein:

determining the expansion n-gram comprises determining expansion n-grams based on respective conditional probabilities indicative of the input n-gram co-occurring with the respective candidate n-grams in bodies of text in the corpus, the expansion n-gram is determined before or after gauging document pair-wise semantic similarity, and the document pair-wise semantic similarity relates to documents in the corpus or a different corpus;

storing, with one or more processors, the expansion n-gram in memory;

adjusting, with one or more processors, the pair-wise semantic similarity of pairs of documents including the input n-gram or the expansion n-gram, wherein at least some adjustments are responsive to documents including the expansion n-gram; and sending, with one or more processors, instructions to the client computing device web browser to display an adjusted visual representation that indicates resulting adjusted pair-wise semantic similarity of the documents.

2. The medium of claim 1, wherein determining the expansion n-gram comprises:

selecting a first set of documents from the corpus in response to determining that the first set of documents each contain the input n-gram;

obtaining a second set of documents from the corpus, the second set of documents including at least some documents that do not include the input n-gram, the first set of documents and the second set of documents each including a plurality of documents;

selecting a set of candidate n-grams from the first set of documents, the set of candidate n-grams having a plurality of n-grams;

determining respective first amounts for each candidate n-gram based on amounts of occurrences of each candidate n-gram in the first set of documents;

determining respective second amounts for each candidate n-gram based on amounts of occurrences of each candidate n-gram in the second set of documents;

determining, for each of the candidate n-grams, a candidate n-gram score based on the respective first amount and the respective second amount for the respective candidate n-gram; and selecting expansion n-grams from among the candidate n-grams based on the candidate n-gram scores.

3. The medium of claim 2, wherein:

obtaining the second set of documents comprises selecting the second set of documents from the corpus in response to determining that the second set of documents each do not contain the input n-gram.

4. The medium of claim 1, wherein determining expansion n-grams based on respective conditional probabilities comprises:

ranking candidate n-grams based on the conditional probabilities and determining that some candidate n-grams have greater than a threshold rank.

5. The medium of claim 1, wherein determining expansion n-grams based on respective conditional probabilities comprises:

forming virtual documents based on distributions of n-grams in the corpus;

determining respective conditional probabilities indicative of the input n-gram co-occurring with the respective candidate n-grams in the virtual documents; and comparing, for each of the candidate n-grams, corresponding respective conditional probabilities indicative of respective conditional probabilities of the input n-gram co-occurring with the respective candidate n-grams in the virtual documents with respective conditional probabilities indicative of the input n-gram co-occurring with the respective candidate n-grams in bodies of text in the corpus.

6. The medium of claim 1, wherein determining expansion n-grams based on respective conditional probabilities comprises:

for a given candidate n-gram, determining a first conditional probability of the given candidate n-gram occurring in a document in the corpus given that the input n-gram appears in the document.

7. The medium of claim 6, the operations comprising:

determining a second conditional probability of the input n-gram appearing in a document in the corpus given that the given candidate n-gram appears in the document; and determining based on the first conditional probability and the second conditional probability that a relationship between the input n-gram and the given candidate n-gram is reciprocated.

8. The medium of claim 1, the operations comprising:

obtaining a relationship graph indicative of relationships within the corpus;

adjusting an edge of the relationship graph based on the expansion n-gram.

9. The medium of claim 8, wherein adjusting the edge of the relationship graph comprises:

determining that formation of the edge is influenced by the expansion n-gram; and adjusting an amount of influence of the expansion n-gram on formation of the edge.

10. The medium of claim 9, wherein adjusting the amount of influence comprises:

down-weighting or up-weighting a term-frequency inverse-document-frequency score of the expansion n-gram in a document feature vector.

11. The medium of claim 1, the operations comprising:

obtaining a plurality of input n-grams supplied by a user via one or more inputs on a user interface presented a client computing device, the one or more inputs being inputs by which users indicate n-grams indicating concepts that are to be enhanced or suppressed in an analysis of the corpus;

determining, for each of the input n-grams, a respective plurality of expansion n-grams; and detecting duplicate entries in the different respective pluralities of expansion n-grams.

12. The medium of claim 1, the operations comprising:

obtaining a clustered document relationship graph; and breaking up a cluster in the document relationship graph or consolidating clusters in the document relationship graph by adjusting strengths of relationships between at least some pairs of documents both including the expansion n-gram and at least some pairs of documents including the input n-gram.

13. The medium of claim 1, the operations comprising:
suggesting a query based on the expansion n-gram; or
expanding a query based on the expansion n-gram.

14. The medium of claim 1, wherein:
determining the expansion n-gram comprises steps for determining expansion n-grams.

15. The medium of claim 1, the operations comprising:
steps for recursively identifying expansion terms based on the expansion n-gram.

16. The medium of claim 1, the operations comprising:
steps for preparing a data visualization of the corpus for display on a user computing device.

17. The medium of claim 1, comprising:
gauging document pair-wise semantic similarity of the documents in the corpus;
sending instructions to a client computing device web browser to display a visual representation of the corpus that indicates the pair-wise semantic similarity of the documents in the corpus;
receiving, from the client computing device web browser, the input n-gram in association with a command to increase or decrease semantic similarity between documents that include the n-gram;
adjusting the pair-wise semantic similarity of pairs of documents including the input n-gram or the expansion n-gram; and
sending instructions to the client computing device web browser to display an adjusted visual representation of the corpus that indicates resulting adjusted pair-wise semantic similarity of the documents in the corpus.

18. A method, comprising:
gauging, with one or more processors, document pair-wise semantic similarity of documents;
sending, with one or more processors, instructions to a client computing device web browser to display a visual representation that indicates the pair-wise semantic similarity of the documents;
receiving, with one or more processors, from the client computing device web browser, an input n-gram in association with a command to increase or decrease semantic similarity between documents that include the n-gram;
obtaining, with one or more processors, access to a corpus including natural language text documents;
determining, with one or more processors, an expansion n-gram by determining that the expansion n-gram is related to the input n-gram based on statistical analysis of co-occurrence of candidate n-grams with the input n-gram in the natural language text of the corpus, wherein:
determining the expansion n-gram comprises determining expansion n-grams based on respective conditional probabilities indicative of the input n-gram co-occurring with the respective candidate n-grams in bodies of text in the corpus,
the expansion n-gram is determined before or after gauging document pair-wise semantic similarity, and
the document pair-wise semantic similarity relates to documents in the corpus or a different corpus;
storing, with one or more processors, the expansion n-gram in memory
adjusting, with one or more processors, the pair-wise semantic similarity of pairs of documents including the input n-gram or the expansion n-gram, wherein at least some adjustments are responsive to documents including the expansion n-gram; and
sending, with one or more processors, instructions to the client computing device web browser to display an adjusted visual representation that indicates resulting adjusted pair-wise semantic similarity of the documents.

19. The method of claim 18, wherein determining expansion n-grams based on respective conditional probabilities comprises:
forming virtual documents based on distributions of n-grams in the corpus;
determining respective conditional probabilities indicative of the input n-gram co-occurring with the respective candidate n-grams in the virtual documents; and
comparing, for each of the candidate n-grams, corresponding respective conditional probabilities indicative of respective conditional probabilities of the input n-gram co-occurring with the respective candidate n-grams in the virtual documents with respective conditional probabilities indicative of the input n-gram co-occurring with the respective candidate n-grams in bodies of text in the corpus.

20. The method of claim 18, wherein determining expansion n-grams based on respective conditional probabilities comprises:
for a given candidate n-gram, determining a first conditional probability of the given candidate n-gram occurring in a document in the corpus given that the input n-gram appears in the document.

21. The method of claim 20, comprising:
determining a second conditional probability of the input n-gram appearing in a document in the corpus given that the given candidate n-gram appears in the document; and
determining based on the first conditional probability and the second conditional probability that a relationship between the input n-gram and the given candidate n-gram is reciprocated.

22. The method of claim 18, comprising:
obtaining a relationship graph indicative of relationships within the corpus;
adjusting an edge of the relationship graph based on the expansion n-gram.

23. The method of claim 22, wherein adjusting the edge of the relationship graph comprises:
determining that formation of the edge is influenced by the expansion n-gram; and
adjusting an amount of influence of the expansion n-gram on formation of the edge.

24. The method of claim 23, wherein adjusting the amount of influence comprises:
down-weighting or up-weighting a term-frequency inverse-document-frequency score of the expansion n-gram in a document feature vector.

25. The method of claim 18, comprising:
obtaining a plurality of input n-grams supplied by a user via one or more inputs on a user interface presented a client computing device, the one or more inputs being inputs by which users indicate n-grams indicating concepts that are to be enhanced or suppressed in an analysis of the corpus;
determining, for each of the input n-grams, a respective plurality of expansion n-grams; and
detecting duplicate entries in the different respective pluralities of expansion n-grams.

26. The method of claim 18, comprising:
obtaining a clustered document relationship graph; and breaking up a cluster in the document relationship graph or consolidating clusters in the document relationship graph by adjusting strengths of relationships between at least some pairs of documents both including the expansion n-gram and at least some pairs of documents including the input n-gram.

27. The method of claim 18, comprising:

suggesting a query based on the expansion n-gram; or
expanding a query based on the expansion n-gram.

* * * * *